US006353450B1

(12) United States Patent
DeLeeuw

(10) Patent No.: US 6,353,450 B1
(45) Date of Patent: *Mar. 5, 2002

(54) PLACING AND MONITORING TRANSPARENT USER INTERFACE ELEMENTS IN A LIVE VIDEO STREAM AS A METHOD FOR USER INPUT

(75) Inventor: William C. DeLeeuw, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,223

(22) Filed: Feb. 16, 1999

(51) Int. Cl.$^7$ ................................................. G06F 3/00
(52) U.S. Cl. ...................... 345/768; 345/764; 345/719; 345/623; 382/719
(58) Field of Search ................................. 345/435, 328, 345/327, 339, 348, 344, 345, 629, 716, 719, 764, 768, 810, 632; 382/203, 195, 206, 190; 348/584, 585, 586, 588

(56) References Cited

U.S. PATENT DOCUMENTS 4,875,097 A  10/1989  Jackson ...................... 345/585
5,850,473 A  12/1998  Anderson .................... 182/165
6,037,936 A   3/2000  Ellenby et al. ............. 345/339
6,037,937 A   3/2000  Beaton et al. .............. 345/339
6,088,018 A   7/2000  DeLeeuw et al. ........... 345/156

FOREIGN PATENT DOCUMENTS

JP           8139994 A     5/1996

OTHER PUBLICATIONS

U.S. application No. 09/096,282, filed Jun. 11, 1998, entitled "Method of Using Video Reflection in Providing Input Data to a Computer System," 39 page specification, 17 pages of drawings.

Primary Examiner—John Cabeca
Assistant Examiner—Kieu D. Vu
(74) Attorney, Agent, or Firm—Steven P. Skabrat

(57) ABSTRACT

Providing input signals to a system having a display, the system being coupled to a source of video data signals, such as a video camera, is accomplished by analyzing the video data signals to detect an object in the scene over or at least partially coinciding with a location of at least one transparent user interface element, inserting at least one transparent user interface element into the captured video data signals, rendering the scene represented by the video data signals on the display such that the scene is transparently visible on the display, and generating an input signal for the system in response to detecting the object over or at least partially coinciding with the at least one transparent user interface element.

19 Claims, 19 Drawing Sheets

| T + OS MIX | OS | T + OS MIX | OS | T + OS MIX | OS | ••• |
| --- | --- | --- | --- | --- | --- | --- |
| OS | T + OS MIX | OS | T + OS MIX | OS | T + OS MIX | |
| T + OS MIX | OS | T + OS MIX | OS | T + OS MIX | OS | |
| OS | T + OS MIX | OS | T + OS MIX | OS | T + OS MIX | ••• |
| ⋮ | | | | | ⋮ | |

FIG. 6

PLACING AND MONITORING TRANSPARENT USER INTERFACE ELEMENTS IN A LIVE VIDEO STREAM AS A METHOD FOR USER INPUT

BACKGROUND

1. Field

The present invention relates generally to graphical user interfaces for systems and, more specifically, to a method for providing input data to a computer system.

2. Description

Many techniques and devices for communicating input data from a user to a computer system have been developed. Keyboards, cursor movement devices (such as a mouse, trackball, and joystick, for example), pens and tablets, bar code scanners, and other devices have all been used to direct a computer to perform selected tasks. With the growing use of video cameras coupled to computer systems such as personal computers (PCs), for example, opportunities for using real-time video data in new and interesting ways have arisen. However, many recent applications for video data in PCs have been focused on various display features, without regard for the possibilities of new input paradigms. What may be valuable are input techniques that take advantage of the capabilities of video cameras to enrich the PC user's experience and make PCs easier to use.

SUMMARY

An embodiment of the present invention is a method of providing input signals to a system having a display, the system being coupled to a source of video data signals, the video data signals representing a scene. The method includes analyzing the video data signals to detect an object in the scene over or at least partially coinciding with a location of at least one transparent user interface element, inserting at least one transparent user interface element into the video data signals, rendering the scene on the display such that the scene is transparently visible on the display, and generating an input signal for the system in response to detecting the object over or at least partially coinciding with the at least one transparent user interface element.

Another embodiment of the present invention is a software filter to analyze live video data signals to detect an object in the scene over or at least partially coinciding with the at least one transparent user interface element, to insert at least one transparent user interface element into the live video data signals, the live video data signals representing a scene, and to generate an input signal for the system in response to detecting the object over or at least partially coinciding with the at least one transparent user interface element.

BRIEF DESCRIPTION OF THE DRAWINGS

The features and advantages of the present invention will become apparent from the following detailed description of the present invention in which:

FIG. 6 is a diagram illustrating an alternating pixel technique mixing between the transparent graphics frame buffer and the operating system output frame buffer according to an embodiment of the present invention;

DETAILED DESCRIPTION

Figure 1:
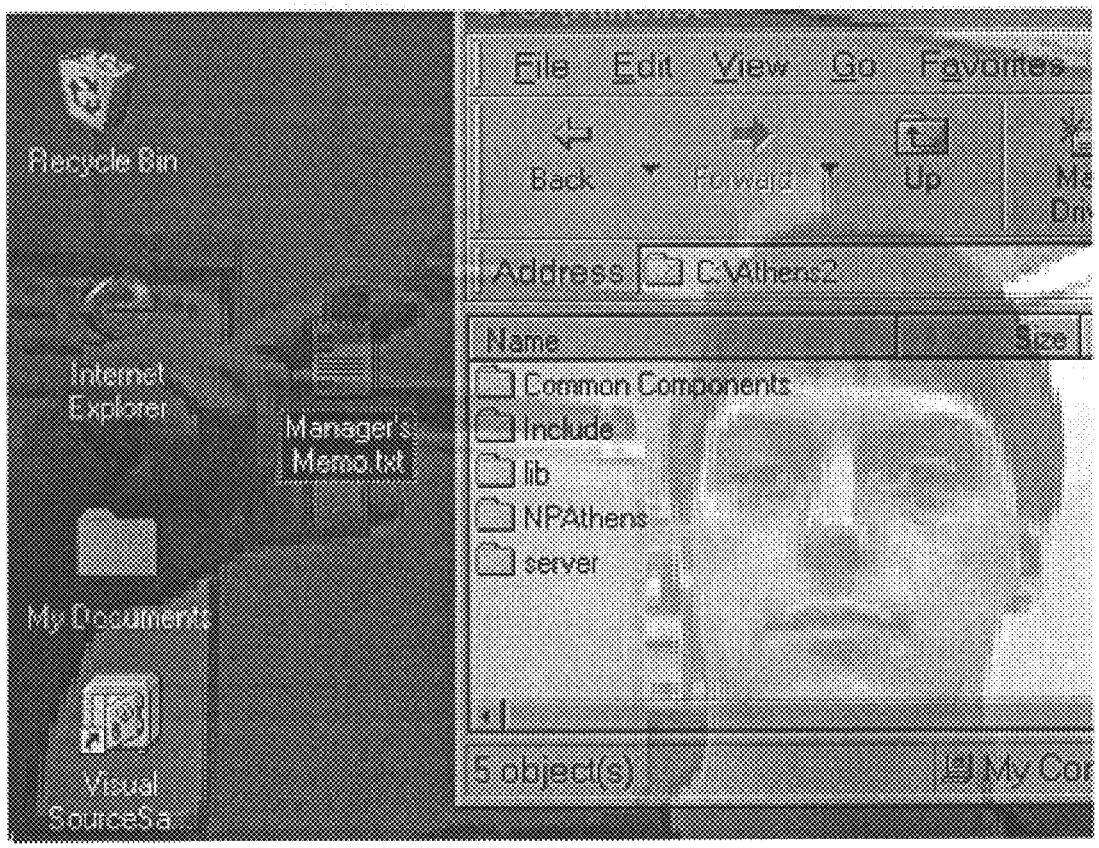
FIG. 1 is a diagram of a sample display portion illustrating video reflection according to an embodiment of the present invention.

An embodiment of the present invention comprises a method for providing user input data signals to a computer system such as a PC, for example. Real-time video images may be captured by a video camera coupled to a PC or received from any other source of video data signals and rendered to the entire screen of the PC's display such that the captured video images may be made transparent and shown on the display. The video data signals may be mixed with the normal application program and operating system software display output data signals so as not to obscure the normal foreground display images. The resulting effect is that when the video camera is pointed toward the user, the user may see a reflected image of himself or herself on the computer screen while the user may also be able to see and interact with other display elements such as transparent controls, desktop icons, or application program displays. Because the reflected image is displayed transparently, it does not interfere with the display of the other display elements.

Reference herein to "one embodiment" or "an embodiment" means that a particular feature, structure or characteristic described in connection with the embodiment is included in at least one embodiment of the present invention. Thus, the appearances of the phrase "in one embodiment" in various places throughout the specification are not necessarily all referring to the same embodiment.

One of the features of at least some embodiments of the present invention is that the user may see his or her reflection or image on the computer screen after it is captured by the video camera. Using this video reflection, the user may interact with application program and operating system display elements of the computer system's graphical user interface (GUI) by physically moving real objects (such as the user's hands and fingers, for example) that are in the field of view of the video camera. The input capability of some embodiments of the present invention may be provided without any modification to existing application programs. In embodiments of the present invention, these movements may be used to direct actions within the computer system such as grasping or selecting icons, transparent controls, and other application program elements, much as the user now does with a mouse or other selection device. This physical movement activity to create a desired result while observing the user's reflected image is very natural and intuitive for users. For example, users frequently look at reflected images of themselves in a mirror, for example, while manipulating objects with their hands without thinking very much about it. Additionally, it is typically easy for users to use either a dominant or non-dominant hand or both hands to perform operations while viewing their reflected image. In alternate embodiments, specific predetermined props may be used as the objects to direct actions within the computer. These props may be active or inactive. Active props contain mechanical or electrical mechanisms such as light emitting diode (LED) lights. Inactive props are items such as colored sticks or paddles, fabric swatches, and colored gloves, for example, although the present invention is not limited in this respect.

In one embodiment, the user interacts with transparent user interface elements such as controls, for example, rendered transparently on the display along with the user's reflected image. In this embodiment, a video camera captures a live video stream of a scene which includes a user. A video capture component produces a reflected video stream, based on the captured video stream, which is capable of being manipulated by an operating system or other components of the system. The reflected video stream may be augmented by placing user interface elements, such as buttons and slider bars, for example, in a transparent manner, in the frames of the video stream at selected locations. The augmented and reflected video stream may be displayed to the user so that the user may see himself or herself and the transparent user interface elements on the display, in addition to the existing display components. The user may then make the transparent video image of his or her hand or another object or prop, for example, move over or at least partially coincide with a transparent user interface element. Herein, "over or at least partially coinciding with" means that the representation of the object on the display at least partially occupies pixels used to represent the transparent user interface element on the display. This action may be detected by a component analyzing the video stream and may be used to enact changes to the element's appearance to indicate an activation or selection of the element. Element activation in this manner may also be used to send control messages to the operating system or an application program.

While some embodiments of the present invention may not replace the use of a computer mouse entirely, it is a powerful new paradigm for user input in a computer system. In particular, it presents a natural and direct method for manipulating computer display objects by moving real objects. Various types of application programs may be extended to make beneficial use of this input paradigm. Computer games, for example, may employ user input through video reflection for increased user interaction. Video presentation systems wherein a user points to selected areas of video display data may be made easier to use. Video-conferencing applications may be extended to provide additional input features. A combination PC/television (TV) may make use of this input capability, especially where the distance between the user and display is relatively large. For many users, such as children, for example, the manipulation of real objects (such as their hands) to send input to a computer system is more intuitive than other typical input devices.

In one embodiment, the colors of pixels in the video data signals sent to the PC for processing and display may be analyzed to track the movement of real objects such as a user's hands. This may be assisted through the use of colored dots attached to the user's hands or fingers or through other computer vision methods. Optionally, distinctive colors may be placed on specific objects (like fingers and thumbs, for example, or other props), to help the computer vision components of embodiments of the present invention isolate and identify objects to be recognized as input event generators.

FIG. 1 is a diagram of a sample display portion illustrating video reflection according to an embodiment of the present invention. In this example, the image of the user is captured by the video camera and rendered in a transparent manner to the display. The user then interacts with display objects, such as non-transparent application program icons, or transparent user interface elements, for example, to provide input signals and events to the system.

An underlying capability of some embodiments of the present invention comprises a method of providing a transparent layer of display data signals (such as video data signals communicated by a video camera, for example) over the top of another layer of display data signals on a computer display so that the user may see both layers clearly and substantially simultaneously, and interact with user interface elements in the transparent layer. This capability will be described first for general use and further below for use with an input detection method of some embodiments of the present invention. The capability to display transparent windows doubles, in essence, the maximum screen area available on a display for use by application programs. One embodiment comprises a method for producing transparent computer graphics layers by interleaving (or alternating in a pattern) the pixels from one video frame buffer with the pixels from another video frame buffer. In this embodiment, selected pixels from a first frame buffer may be mixed by color averaging with corresponding pixels from a second frame buffer to reduce the "checkerboard" effect created by the use of spatial multiplexing alone. Additionally, because the degree of interleaving is adjustable and the color averaging may be weighted, the degree of transparency of the displayed images may be controlled.

In this embodiment, an output frame buffer used by operating system software is not affected by provision of the transparency feature and the operating system is unaware of the transparency operations. Hence, the transparency effect provided by embodiments of the present invention does not employ modifications to application programs for transparency to work over them. Furthermore, absent specific design modifications, input operations to application program and operating system windows are not affected by transparent foreground effects.

An embodiment of the present invention operates by combining at least two frame buffers of computer graphics output data or video data in the form of electrical signals. The pixels of the output, or visible, frame buffer are created by spatially interleaving the contents of two input frame buffers. The interleaving in this embodiment is accomplished by combining pixels of one frame buffer with those of the other frame buffer. This results in the visual illusion of two displays of images layered one on another. As the pixels are being interleaved, the pixels of the first frame buffer are color averaged with the pixels of the second frame buffer that they are about to replace. Color averaging is performed on the pixels of one frame buffer by averaging them with the corresponding pixels of the other frame buffer prior to, or during, interleaving them into the output frame buffer. The result comprises multiple overlapping images being substantially simultaneously visible on a display such as a computer monitor, for example.

Figure 2:
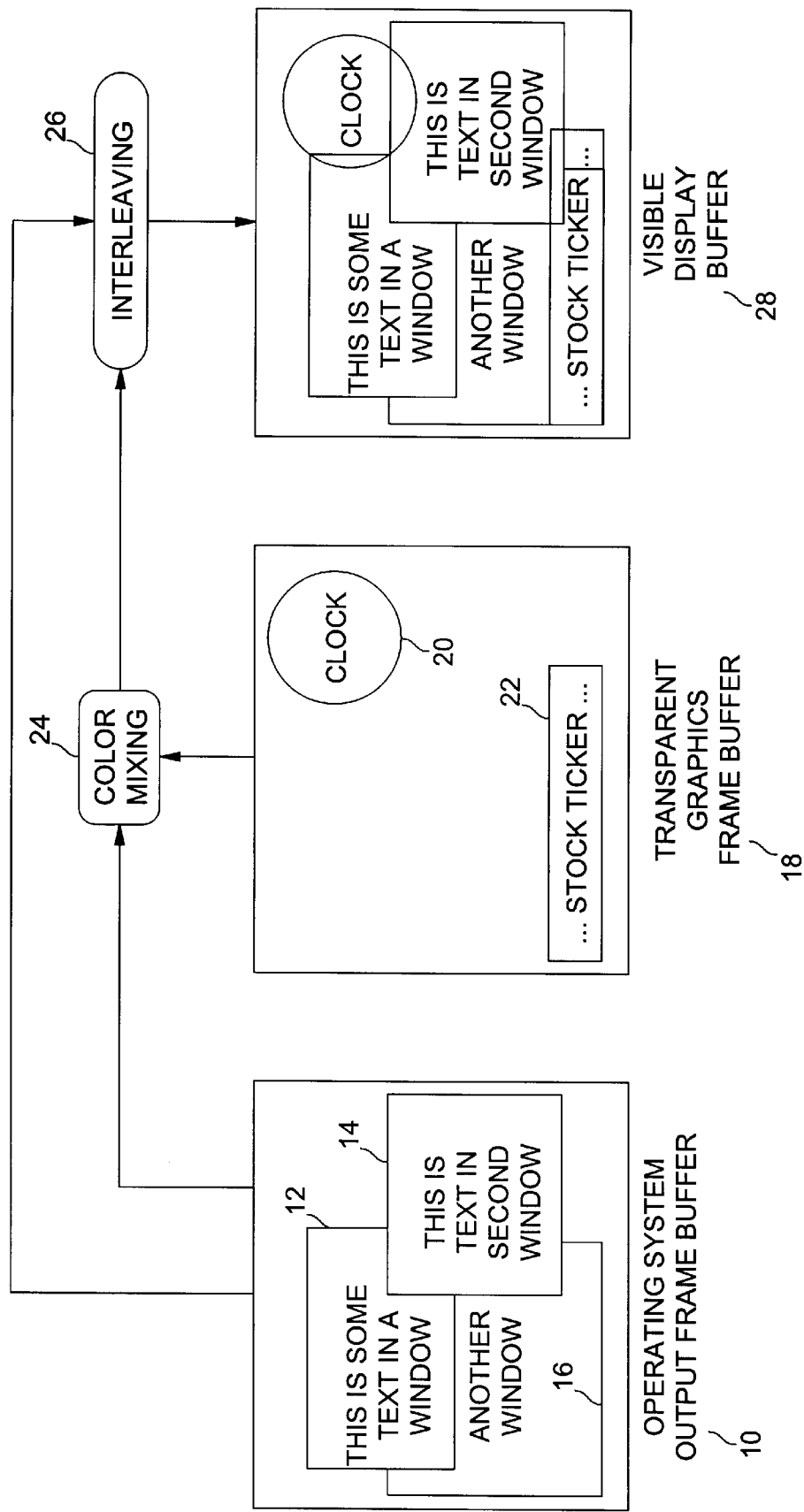
FIG. 2 is a diagram illustrating an example of transparent graphics data displayed with operating system output graphics data according to an embodiment of the present invention.

FIG. 2 is a diagram illustrating an example of transparent graphics data displayed with operating system output graphics data according to an embodiment of the present invention. Operating system output frame buffer 10 is an area of memory used to store the current display data of the computer system shown below in FIG. 3. The operating system output frame buffer may be allocated in any memory available to the operating system. A frame buffer is a set of storage locations to store a two-dimensional array of pixel data. The operating system output frame buffer may be associated with operating system software of the computer system, which controls the generation and display of the data signals on a computer monitor (not shown). In one embodiment, the operating system software comprises the Windows 95® or Windows NT® operating system software available from Microsoft Corporation, although other operating system software supporting graphical user interfaces may also be employed. In this example, the operating system output frame buffer 10 contains application program display data signals for three overlapping windows shown pictorially in FIG. 2 and labeled 12, 14, and 16, respectively.

Transparent graphics frame buffer 18 is an area of memory used to store the display data of transparent graphics for substantially simultaneous display with the display data signals of the operating system output frame buffer. This area of memory may be allocated in any memory available in the system. Transparent graphics frame buffer 18 may be used to store frames of video data received from a video camera or other source of video data signals and/or transparent user interface elements. In the example shown in FIG. 2, display components such as a clock 20 and stock ticker 22 are shown as sample application program display features which illustrate the use of transparency, although generally any display components may be made transparent through the use of embodiments of the present invention. More specifically, in embodiments of the present invention, captured video frames may be shown as a sequence of transparent images on the display.

The display components of the operating system output frame buffer and the transparent graphics frame buffer may be combined in block 24 by color mixing selected corresponding pixels of each buffer while interleaving the resulting pixels of the color mixing operation with the operating system output frame buffer's pixels to form the display components of visible display buffer 28. The visible display buffer shows in pictorial form the three overlapping windows 12, 14, and 16 with the clock 20 and stock ticker 22 displays appearing as transparent display components overlaying portions of the windows. In this example, the transparent display components are partially overlaying the other display components. However, it should be understood that the transparent display components may be entirely within the boundaries of one or more non-transparent windows or display components on the display. Of course, in certain application programs and with certain display components, the display of data from two display components with one substantially or even completely on top of the other may present image quality problems for the user. Nonetheless, in other application programs the ability to overlay transparent display components in a well designed manner is advantageous and desirable.

In addition, some embodiments of the present invention allow transparent display components overlaying background windows to have little or no effect on input operations to a selected background window. For example, a user may interact with an input window of an application program being displayed in a background window while a transparent display component is partially or completely overlaying the background window. Generally, the operating system software may accept the user input events or key strikes to the input window (such as a mouse entry or text entry) without substantial interference with the display of the transparent display components.

Figure 3:
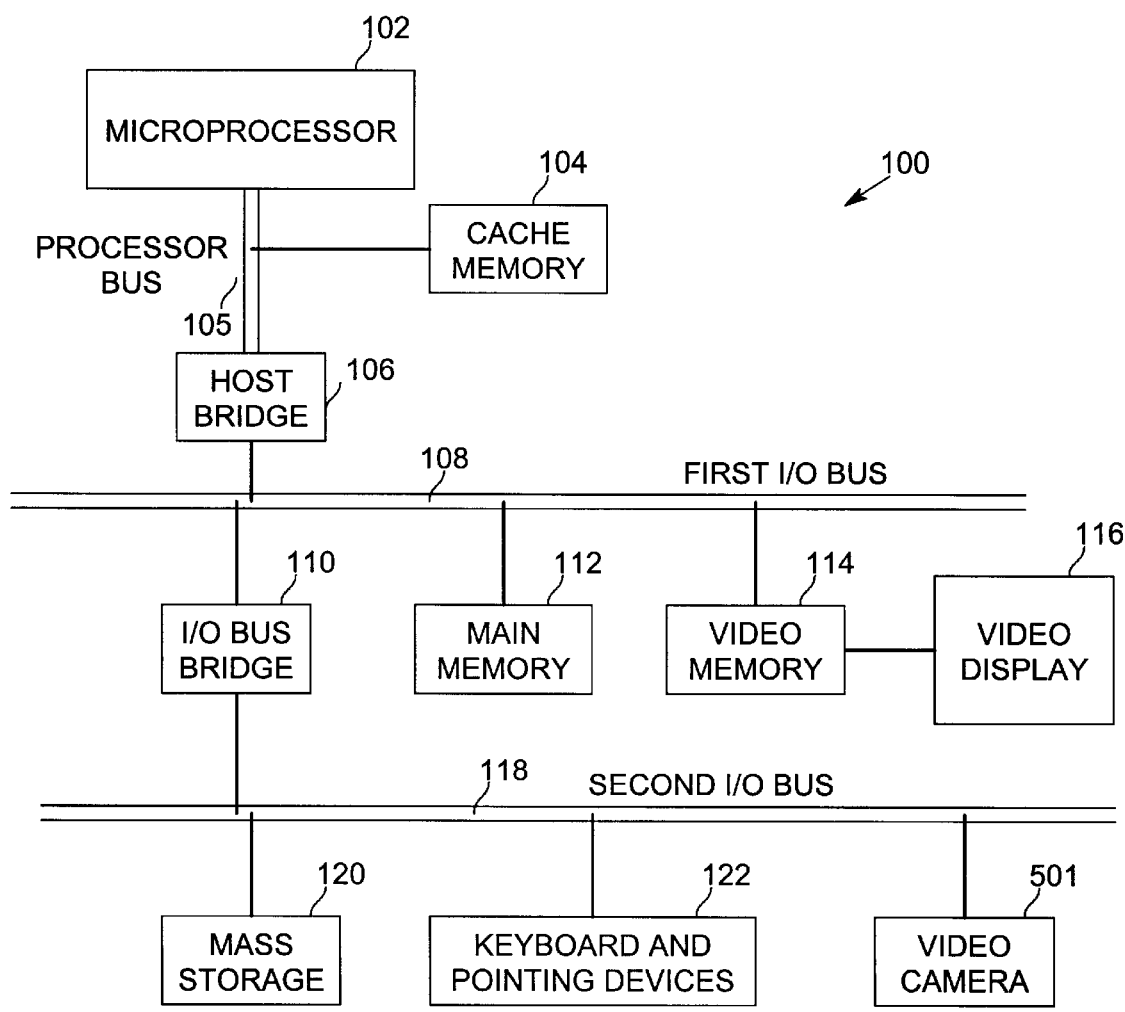
FIG. 3 is a diagram illustrating a sample system capable of being programmed with a transparency method according to an embodiment of the present invention.

In accordance with some embodiments of the present invention, a method for producing transparency effects employs minimal mixing of display contents. Instead, it relies on the human eye's inability to distinguish between the color of adjacent pixels on a computer monitor (in essence, the human eye averages each pixel with its neighbor). Some mixing is employed, because large computer monitors and low display resolutions may result in a "checkerboard" effect when pixels are interleaved in this manner. In one embodiment, one half of the pixels from a first frame buffer (such as the operating system output frame buffer) are averaged with the corresponding one half of the pixels from a second frame buffer (such as the transparent graphics frame buffer) as the pixels of the two frame buffers are interleaved into a third display buffer. By averaging a fraction of the pixels, there may be a decrease in the processing power used when providing the transparency effect. In alternate embodiments, different percentages of pixels may be averaged (e.g., one fourth of the pixels, one eighth of the pixels, one sixteenth of the pixels, one thirty-second of the pixels, or any one Nth of the pixels where N is a positive integer), and the percentages may be changed dynamically FIG. 3 is a diagram illustrating a sample system capable of being programmed according to an embodiment of a method for producing transparency displays in conjunction with video reflection to obtain user input signals in accordance with the present invention. Sample system 100 may be used, for example, to execute the processing for the methods described herein. Sample system 100 is representative of computer systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. Sample system 100 includes microprocessor 102 and cache memory 104 coupled to each other through processor bus 105. Sample system 100 also includes first I/O bus 108 and second I/O bus 118. Processor bus 105 and first I/O bus 108 are bridged by host bridge 106, whereas first I/O bus 108 and standard I/O bus 118 are bridged by I/O bus bridge 110. Coupled to first I/O bus 108 are main memory 112 and video memory 114. Coupled to video memory 114 is video display 11 6. Coupled to second I/O bus 118 are mass storage 120, and keyboard and pointing devices 122. In one embodiment, a video camera 501 may also be coupled to second I/O bus 118.

These elements perform their conventional functions well-known in the art. In particular, mass storage 120 may be used to provide long-term storage for the executable instructions for embodiments of methods for obtaining user input signals through the use of video reflection in accordance with the present invention, whereas main memory 112 is used to store on a shorter term basis the executable instructions of embodiments of the methods for obtaining user input signals through the use of video reflection in accordance with the present invention during execution by microprocessor 102. In addition, the instructions may be stored on other machine readable mediums accessible by the system, such as compact disk read only memories (CDROMs), digital versatile disks (DVDs), and floppy disks, for example.

Figure 4:
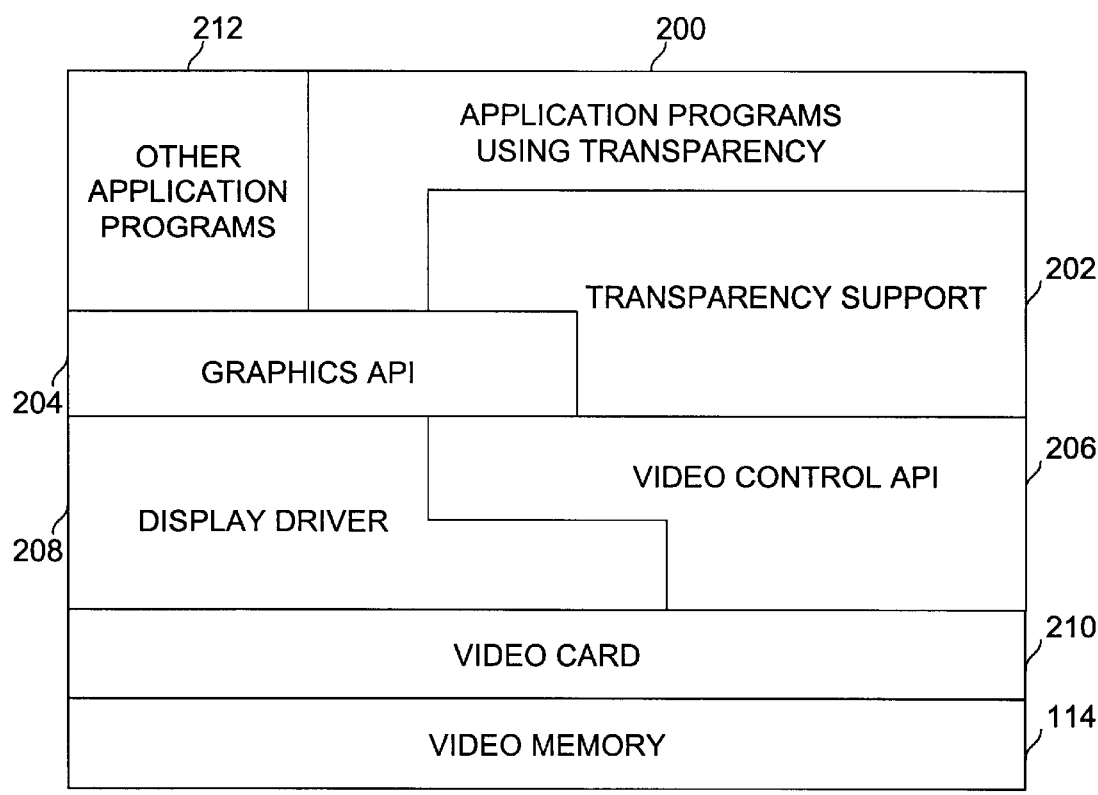
FIG. 4 is a diagram of a software and hardware stack for implementing transparent graphics according to an embodiment of the present invention.

FIG. 4 is a diagram of a software and hardware stack for implementing transparent graphics according to an embodiment of the present invention. Application programs 200 designed to use transparent display objects call functions provided by transparency support software 202 to define and update the transparent display objects. In response, transparency support 202 calls the operating system graphics rendering programming interface (graphics API) 204 in this embodiment. In the Windows95® operating system, this may be the Graphics Device Interface (GDI). The transparency support software 202 also calls the operating system's video hardware control abstraction programming interface (video control API) 206 in this embodiment. In the Windows95® operating system, this may be the DirectDraw™ API, available from Microsoft Corporation. In some operating systems, the graphics API 202 and video control API 206 may not be distinguishable from each other as they may exist within the same application programming interface. The graphics API 204 may be used to render requested graphics to the transparent graphics frame buffer 18 shown in FIG. 2. The video control API 206 may be used to control frame buffer visibility and to access the contents of all frame buffers. In this embodiment, the graphics API 204 and video control API 206 interact with display driver software 208 to communicate with video card 210. The video card 210 controls the video display 116 in the system of FIG. 3. Video card accesses video memory 114 to obtain display data. Other application programs 212, which do not employ transparency, interact with the graphics API 204 to create and update display objects.

Generally, images may be displayed on a display such as a computer monitor, for example, by creating a frame buffer of pixel data in video memory 114. This frame buffer may be designated as a visible portion of video memory by video control API 206. If there is a sufficient amount of video memory available, multiple frame buffers may be defined, only one of which may be used at a time (by the video card 210) to obtain the data signals for building the current visible display. In a well-known double buffering technique, a first frame buffer is considered to be the "visible" buffer and the video card 210 reads data signals from it to obtain the current display data signals, while a second frame buffer (or "non-visible" buffer) is written to with new display data. In this embodiment, the video control API is then called upon to "flip" the frame buffers by designating the second frame buffer to be the visible buffer and designating the first frame buffer to be the non-visible buffer. Use of this technique provides for the smooth update of display data, resulting in aesthetically pleasing displays for the user. Embodiments of the present invention may extend this concept to employ extra frame buffers to provide the transparent display data signals in conjunction with normal display data.

Figure 5:
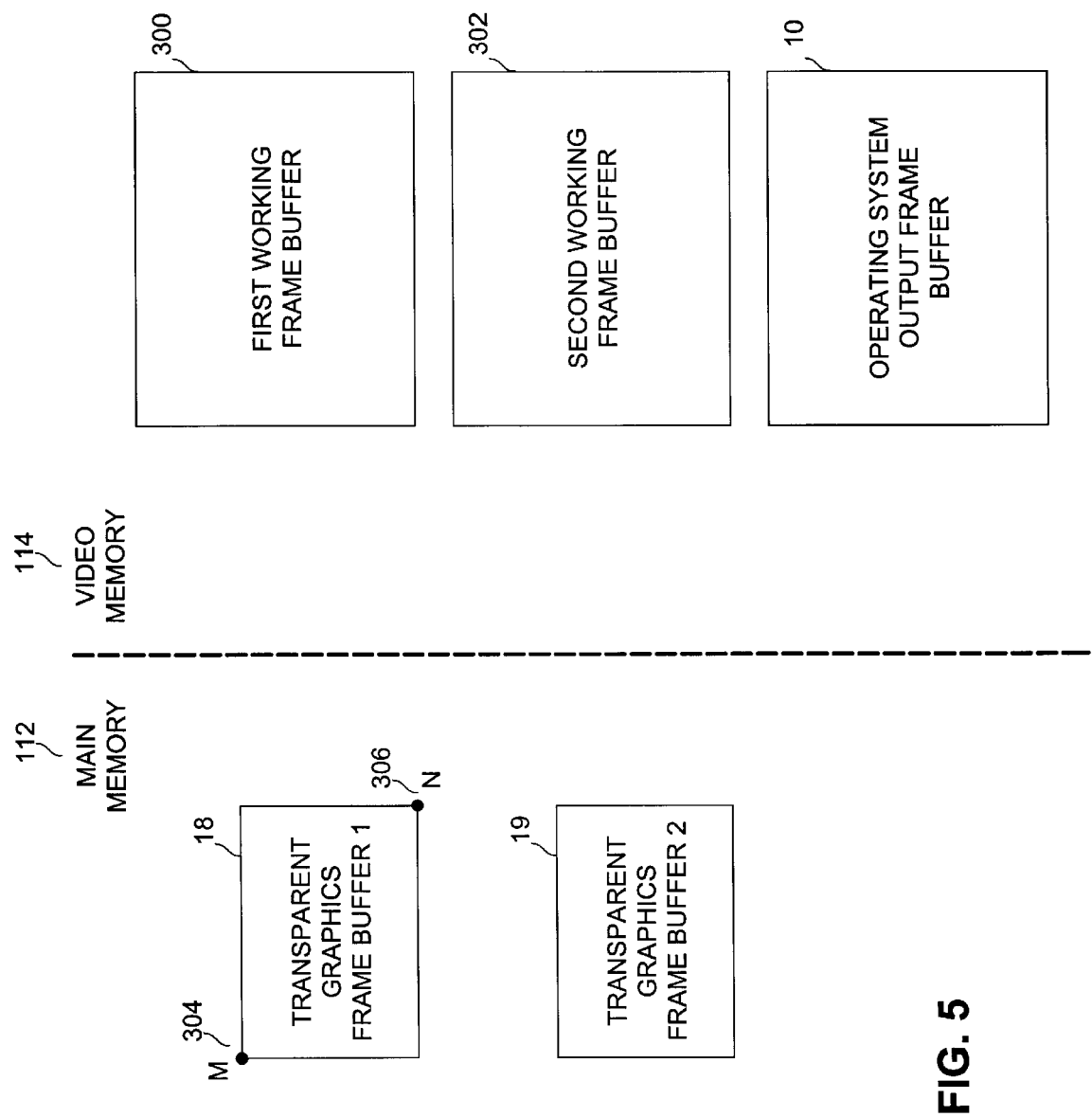
FIG. 5 is a diagram illustrating multiple frame buffers used for providing transparent graphics according to an embodiment of the present invention.

FIG. 5 is a diagram illustrating an embodiment of multiple frame buffers used for providing transparent graphics. At least one designated portion of the video memory may be assigned to be displayed as visible on the computer monitor at a time. This is called the "visible display". That is, the visible display comprises the display data from an area of video memory that is currently displayed on the computer monitor for viewing by a user. Generally, in this embodiment the graphics API 204 of the operating system software writes data signals into the operating system output frame buffer 10 using display driver 208 and/or video control API 206. In most current systems, the operating system output frame buffer, resident in video memory 114, is used for the visible display. However, in embodiments of the present invention, other frame buffers may be used as the visible display. A first working frame buffer 300 and a second working frame buffer 302, both resident in video memory 114 or other accessible memory, store display data according to embodiments of the present invention. In this embodiment, each frame buffer stores an array of pixel data signals. The size of the array in this embodiment is dependent on the current display characteristics of the system. Frame buffer array sizes may, for example, be 640 pixels by 480 pixels, 800 pixels by 600 pixels, or 1280 pixels by 1024 pixels, or other appropriate sizes dependent on the computer monitor and operating system software settings. Each pixel includes red (R), green (G), blue (B), and optionally, opacity (A) components. Alternatively, other color coding schemes such as YUV or YUVA may also be used. Multiple transparent graphics frame buffers 18, 19, resident in main memory 112 or in video memory 114, in this embodiment store transparent display data signals created by transparency support software 202, video control API 206, and graphics API 204. The transparent graphics frame buffers 18, 19 are "double-buffered" similar to the working frame buffers to provide rapid updates to the transparently displayed images.

In one embodiment, data signals from one of the transparent graphics frame buffers 18, 19 may be color mixed and interleaved with data signals from operating system output frame buffer 10, and then stored in one of the working frame buffers. In an alternate embodiment, the mixing may be accomplished with the assistance of dedicated circuitry for alpha blending. This mixed and interleaved data may be stored into a working frame buffer when the working frame buffer is in a "non-visible" state (that is, in this embodiment the data stored in the frame buffer is not currently displayed on the computer monitor). While one of the working frame buffers is being written to in a non-visible state, the other working frame buffer may be in a "visible" state and used as the source of current display data. When the color mixing and interleaving operations are complete for a working frame buffer, the non-visible working frame buffer may be designated the visible working frame buffer and vice versa. This double buffering of the working frame buffers process may be repeated at a rate of at least 8–15 times per second in this embodiment to provide a visually appealing display to a user.

Additionally, in this embodiment use of the transparent graphics frame buffers is also double buffered. In this embodiment, double buffering of the transparent graphics frame buffers is employed because color mixing may not be performed on a frame buffer that is currently being modified, and a frame buffer that is being mixed from may not be updated at the same time. Without double buffering, errors may result in the displayed images or unnecessary processing delays may be incurred.

In some embodiments of the present invention, interleaving of the pixels of one of the transparent graphics frame buffers and the operating system output frame buffer may be accomplished as follows. In one embodiment, alternating pixels in the selected working frame buffer may be written by a mix of a transparent graphics frame buffer pixel value and a spatially corresponding operating system output frame buffer pixel value. The other pixels in the selected working frame buffer may be written with pixels from the operating system output frame buffer. In another embodiment, pixels from the operating system output frame buffer may be block transferred to the selected working frame buffer and pixels from the transparent graphics frame buffer may be subsequently spatially multiplexed and color averaged with the pixels of the selected working frame buffer. In another embodiment, the mixing may be accomplished with the assistance of circuitry on the video card for performing alpha blending. Note that interleaving may not be necessary when using dedicated circuitry for alpha blending.

FIG. 6 is a diagram illustrating an embodiment of one method of alternating pixel mixing between one of the transparent graphics frame buffers and the operating system output frame buffer. A "T+OS Mix" pixel in the selected working frame buffer comprises a color averaged mix of a pixel from the selected transparent graphics frame buffer (the T value) and a pixel from the operating system output frame buffer (the OS value). An "OS" pixel in the selected working frame buffer contains a spatially corresponding pixel copied from the operating system output frame buffer. In this embodiment, color averaging may be performed through a weighted averaging scheme on each color component of each pixel from corresponding positions within the two frame buffers, although in other embodiments, different color mixing techniques may also be employed. In one embodiment, weighted averaging may be accomplished by multiplying a component value of a first pixel by a weight value and multiplying the same component value of a second pixel by a different weight value. The two weighted color components may then be added together and the resulting sum may be divided by the sum of the two weight values. This method is also known as alpha blending. By using this alternating pattern, the processing employed to create the transparent effect may be cut in half, for example, in comparison to a mixing of all pixels of the frame buffers. The pixel data movement within the video memory may be performed by a block transfer operation provided by the drawing API or video control API in this embodiment.

Figure 7:
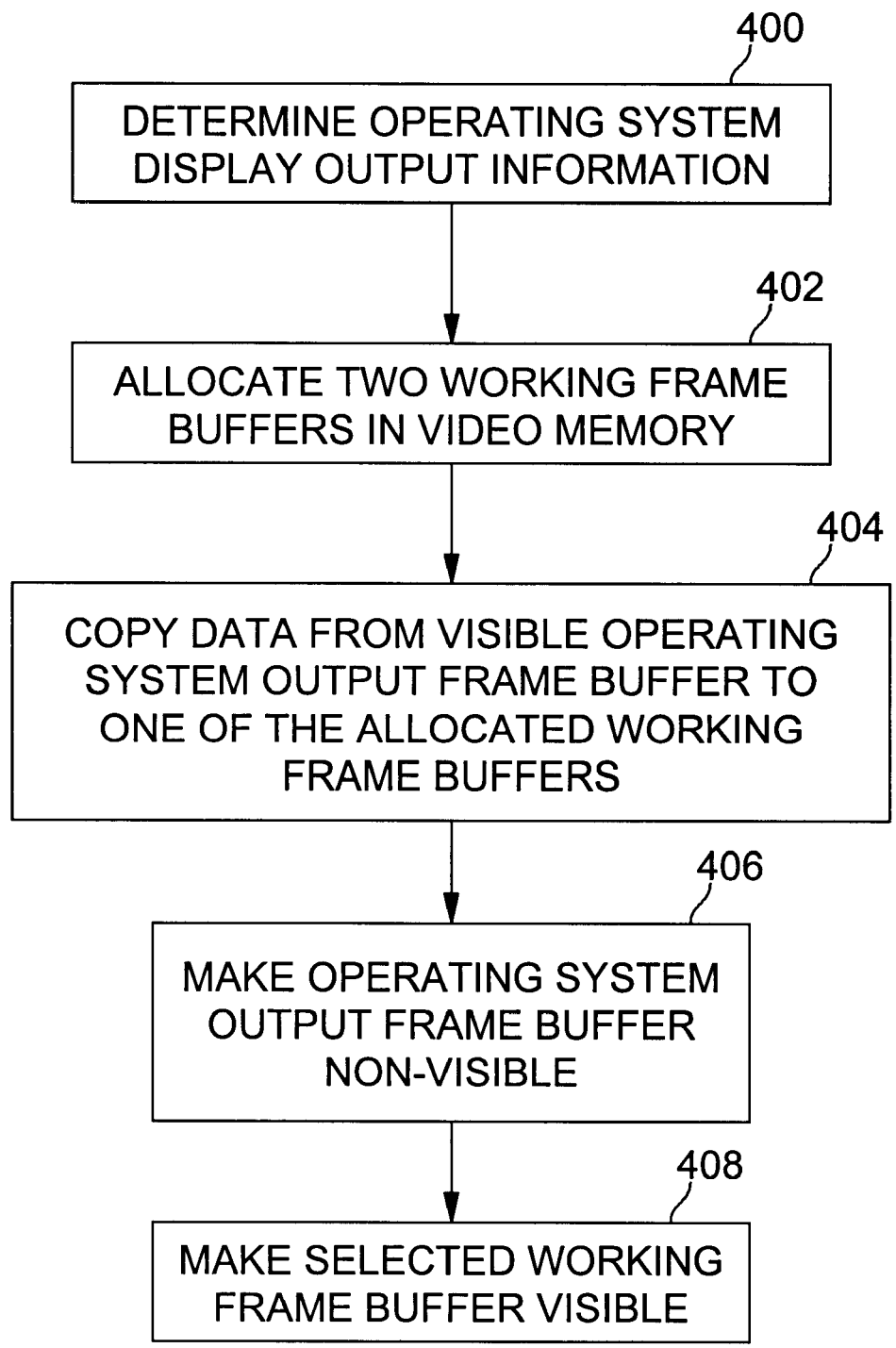
FIG. 7 is a flow diagram for initializing a system to provide transparent graphics according to an embodiment of the present invention.

FIG. 7 is a flow diagram illustrating an embodiment for initializing a system to provide transparent graphics. At block 400, the operating system display output control information may be determined. This control information comprises the size of the display, color resolution, and other data. Next, at block 402, two working frame buffers may be allocated in video memory in this embodiment. These operations may be performed by calls to the video control API in this embodiment. At block 404, a block transfer operation may be performed to copy data from the normally visible operating system output frame buffer to a selected one of the two working frame buffers. Assume for this example that the second working frame buffer is selected first, although the first working frame buffer may also be used as the initial working frame buffer. The block transfer may be performed by a call to the video control API in this embodiment. At block 406, the operating system output frame buffer may be set to a "non-visible" state by a call to the video control API. At block 408, the selected working frame buffer (for example, the second working frame buffer) may be made visible by a call to the video control API in this embodiment. In some embodiments, block 406 and block 408 may be accomplished by a single call to the video control API. At this point, the video card's current display output data may be obtained from the selected working frame buffer, not the operating system output frame buffer. In alternate embodiments, other APIs may also be used to effect the same results.

Figure 8:
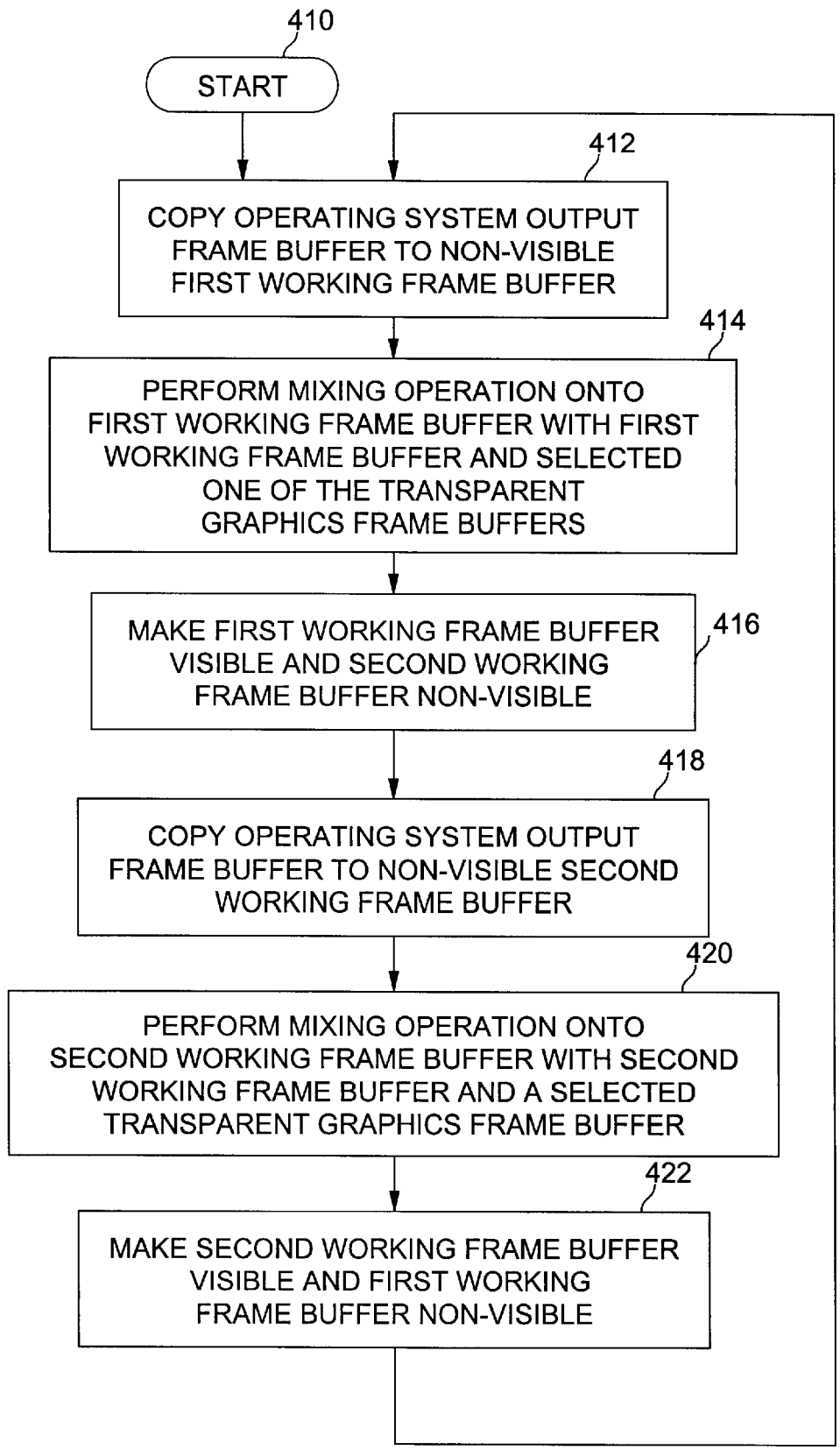
FIG. 8 is a flow diagram showing double buffering control processing according to an embodiment of the present invention.

FIG. 8 is a flow diagram showing an embodiment of double buffering control processing. After starting block 410, a block transfer operation may be performed at block 412 to copy the operating system output frame buffer to the non-visible first working frame buffer by a call to the video control API in this embodiment. At block 414, an operation may be performed to write the mixed and interleaved contents of the first working frame buffer and a selected one of the transparent graphics frame buffers to the first working frame buffer. At block 416, the first working frame buffer may be made visible and the second working frame buffer may be made non-visible, in effect, flipping the two frame buffers as the current display output data source. At block 418, a block transfer operation may be performed to copy the operating system output frame buffer to the non-visible second working frame buffer by a call to the video control API in this embodiment. At block 420, an operation may be performed to write the color mixed and interleaved contents of the second working frame buffer and a selected one of the transparent graphics frame buffers to the second working frame buffer. The selected transparent graphics frame buffer may be the transparent graphics frame buffer previously selected at block 414 or the other transparent graphics frame buffer. At block 422, the second working frame buffer may be made visible and the first working frame buffer may be made non-visible, in effect, flipping the two frame buffers as the current display output data source. This process may be repeated by returning to block 412. During each of the previous blocks, the operating system software may be concurrently writing additional display data into the operating system output frame buffer.

Figure 9:
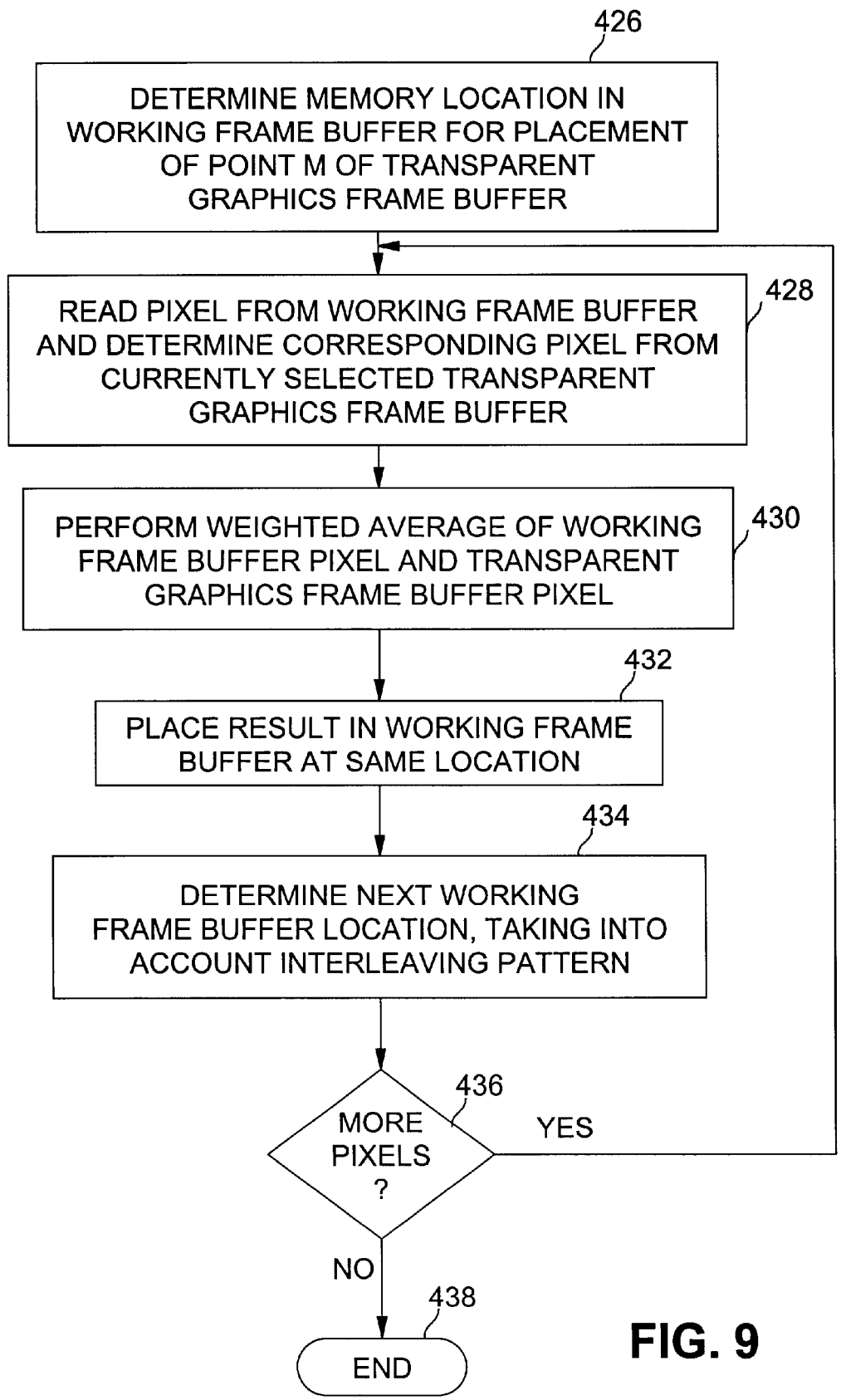
FIG. 9 is a flow diagram of color mixing and interleaving processing according to an embodiment of the present invention.

An embodiment of the color mixing and interleaving operation of blocks 414 and 420 is further described with reference to FIG. 9. At block 426, a memory location in the currently non-visible (either the first or the second) working frame buffer may be determined for a reference point (e.g., point M 304) of the currently selected transparent graphics frame buffer. At block 428, a data signal value for a pixel from the currently non-visible working frame buffer may be read and the spatially corresponding pixel(s) from the currently selected transparent graphics frame buffer may be determined. This correspondence may not necessarily be a 1:1 ratio since the transparent graphics frame buffer image may be stretched or reduced to fit a portion of the working frame buffer. This pixel correspondence determination is well-known in the art and is commonly used in stretch block transfers in operating system software (e.g., the StretchBlt function in the Windows95® operation system). Next, at block 430, in this embodiment the weighted average of the pixel from the working frame buffer and the pixel from the currently selected transparent graphics frame buffer may be computed. The weighted averages of the individual pixel components may be determined on a color component by color component basis. That is, red components may be averaged, blue components may be averaged, and green components may be averaged. The weight that is given to each of the components determines the resulting transparency of the pixel, however the same weight value may be used for all components of a given pixel. It is the weight associated with a pixel that affects at least in part the level of transparency. These weights may be manipulated by the application program employing transparency to achieve various mixing ratios. Furthermore, the application program employing transparency may provide user interface elements that allow the user to control the mixing ratios directly or indirectly.

The result of the weighted averaging computation may be placed into the same location in the working frame buffer at block 432 as the current pixel being processed. At block 434, the next location in the working frame buffer to be processed may be determined, taking into account the current interleaving pattern (e. g., using every second pixel, every fourth pixel, horizontally or vertically alternating lines, etc.). At block 436, if more pixels of the working frame buffer and the currently selected transparent graphics frame buffer are to be processed, processing continues with block 428 with the next pixel. Otherwise, color mixing and interleaving processing ends at block 438.

Figure 10:
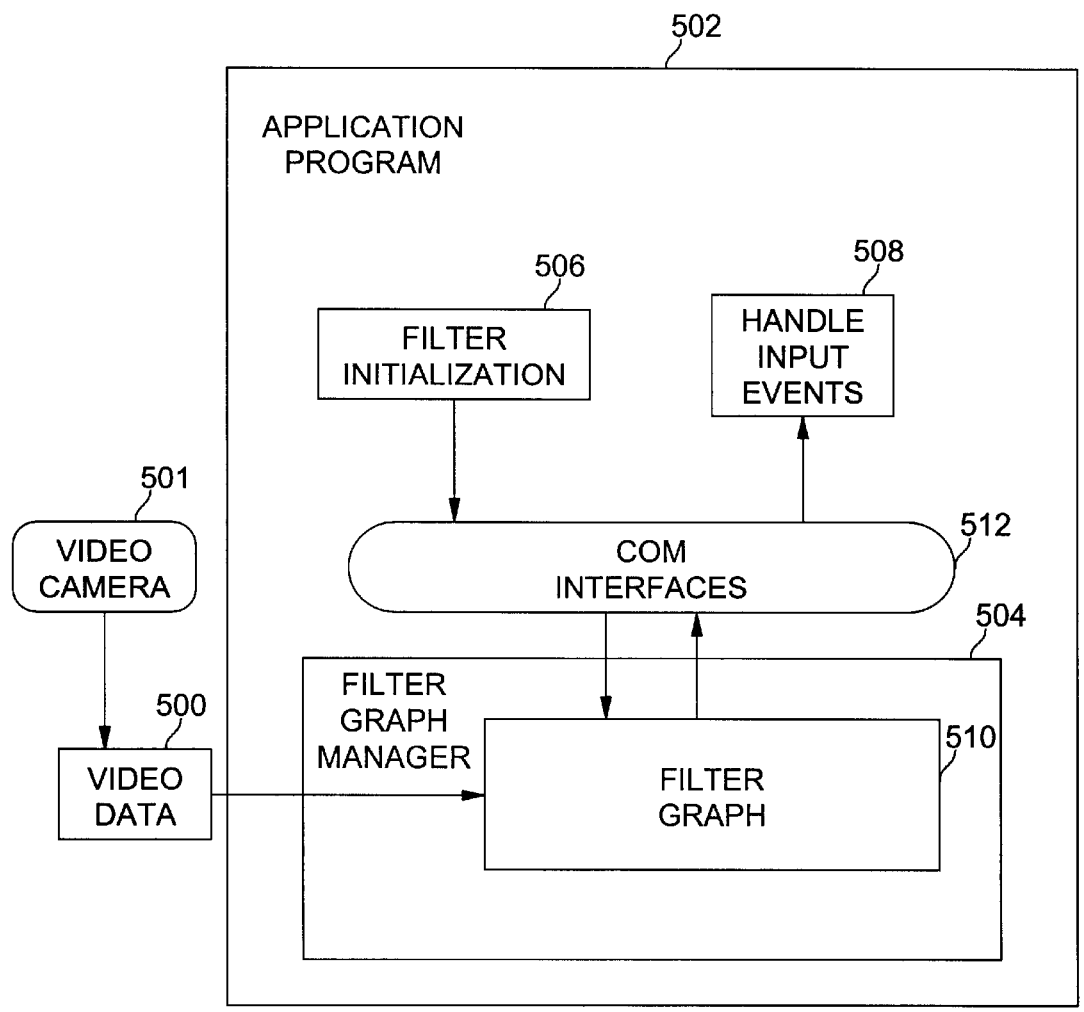
FIG. 10 is a diagram illustrating components of an application program providing a video reflection input technique according to an embodiment of the present invention.

FIG. 10 is a diagram illustrating components of an application program providing a video reflection input technique according to an embodiment of the present invention. Video data signals 500 may be generated by a video camera 501 coupled to a system such as is shown in FIG. 3, or by any other video source. The video camera may be coupled to the standard I/O bus 118 and provides the video data signals 500 for storage in mass storage 120 or main memory 112. Once the video data signals are within the system 100, they may be processed by programs being executed by microprocessor 102, such as application program 502 and filter graph manager 504 of FIG. 10, for example. Referring back to FIG. 10, application program 502 may be designed to provide any desired functionality for a user. At a minimum, in this embodiment the application program is designed to provide the capability of user input through the use of video reflection. The application program may interact with other application programs (not shown) and the operating system software (not shown) being executed by the processor of the computer system. When application program 502 is designed to provide the capability of user input selections through the use of video reflection in accordance with some embodiments of the present invention, the application program comprises filter graph manager 504, filter initialization 506, handle input events 508, filter graph 510, and COM interfaces 512.

In one embodiment, a filter graph 510 may be created as part of a filter graph architecture of the ActiveMovie™ application programming interface (API) (also known as the DirectShow™ or DirectMedia™ API) available from Microsoft Corporation, although in other embodiments, other APIs may be used and the invention is not limited in scope in this respect. ActiveMovie™ is a software architecture that controls and processes streams of multimedia data signals, as well as run-time environment software that uses the architecture to allow users to play digital video and sound encoded in various well-known data formats on a PC. The playback capability makes use of video and audio hardware cards that support the DirectX™ set of APIs, available from Microsoft Corporation, although other APIs may also be used and the invention is not limited in scope in this respect. The ActiveMovie™ architecture defines how to control and process streams of time-stamped multimedia data signals by using modular software components called filters connected in a configuration called a filter graph 510.

A software object called a filter graph manager 504 may be accessed by application program 502 to control how the filter graph 510 may be assembled and how data may be moved through the filter graph. The instantiated filter graph manager generates and manages the filter graph. The filter graph comprises at least one custom filter for processing video data signals. The filter graph manager 504 provides a set of Component Object Model (COM) interfaces 512 to allow communication between the filter graph and application program 502. Application program 502 may call the filter graph manager COM interfaces to control processing of the multimedia data stream or retrieve filter events. Since application program 502 processes the incoming video data stream from the coupled video camera 501, in this embodiment the filter graph manager and filter graph are incorporated into the application program. In other embodiments, the filter graph manager may be a separate program independent of the application program.

In one embodiment, all components of the filter graph architecture may be implemented as COM objects. This includes the filters through which data signals may be passed, and filter components that serve as connections between filters or that allocate memory. Each object implements one or more interfaces, each of which comprises a predefined set of functions called methods. Generally, application program 502 calls a method to communicate with the object exposing the interface. For example, the application program may call methods on an IMediaControl interface on the object of filter graph manager 504, such as a Run method, which starts a multimedia data stream. Filter graph manager, in turn, calls a Run method on the IFilter interface exposed by each of the filters of the filter graph 510.

A filter graph 510 may comprise a collection of filters of different types. Most filters may be categorized as one of three types. A source filter takes data signals from some source, such as a file on disk, a satellite feed, an Internet server, or a video camera 501, and introduces the data signals into the filter graph. A transform filter takes the data signals, processes them, and passes them along to another filter. A rendering filter renders the data signals. Typically, the processed data signals may be rendered to a hardware device such as a computer display, but the data may also be rendered to any location that accepts media input (such as a memory or a disk file, for example).

Generally, filter graphs may be used to stream multimedia data, such as video data, for example, through filters. In a multimedia data stream, one filter passes the multimedia data downstream to the next filter in the filter graph. To make a filter graph operate, filters may be connected in a predetermined order, and the multimedia data stream may be started and stopped in the predetermined order. The filter graph manager connects filters and controls the multimedia data stream. Controlling the multimedia data stream comprises starting, pausing, or stopping the multimedia data stream, playing the data stream for a particular duration, or seeking a particular point in the data stream. Filter graph manager 504 allows application program 502 to specify these activities, and then calls the appropriate methods on the filters to invoke them. The filter graph manager also allows filters to post event notifications that the application program may retrieve. In this way, the application program may retrieve the status of a filter that the application program has installed in the filter graph, once multimedia data is flowing through the filter graph.

During processing initialization, application program 502 instructs filter graph manager 504 to load a graph file (not shown) which describes the filter graph. The filter graph manager creates filter graph 510 based on the graph file and filter behavior commands received from filter initialization 506. The filter behavior commands refer to specific filters by name and specify input and control parameters for the filters. When video data 500 is streaming through the filter graph and being processed according to specified filters, event notifications (also known as window messages) may be sent from the filter graph through COM interfaces 512 to handle input events 508. In one embodiment, the input event may be determined to be a mouse down event or a mouse up event. In other embodiments, the input event may be any user input selection detected during the filter graph's processing of the video data stream, such as an activation or selection of a transparent control, for example. Handle input events 508 receives the event notification and handles it for application program 502. In some embodiments, the handle input events 508 may comprise calls to other components within the application program to perform desired functions.

Figure 11:
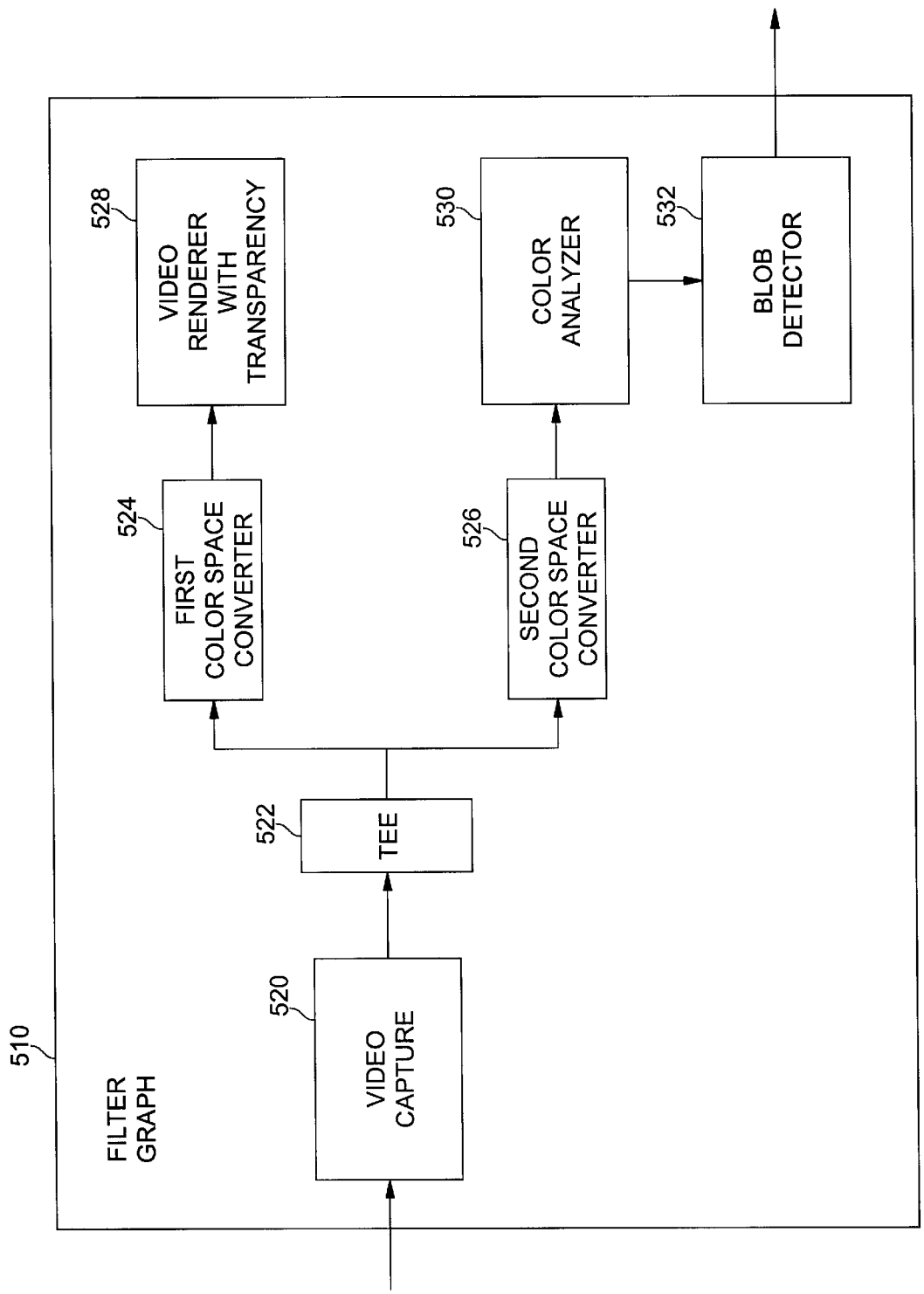
FIG. 11 is a diagram of a filter graph according to an embodiment of the present invention.

FIG. 11 is a diagram of a filter graph according to an embodiment of the present invention. In this embodiment, the filter graph comprises seven filters: video capture filter 520, tee filter 522, optional first and second color space converter filters 524, 526, video renderer with transparency filter 528, color analyzer filter 530, and blob detector filter 532, although the invention is not limited in this respect. Video capture filter 520 captures individual frames of video data signals received by the PC from a coupled video camera or other video source. Each frame of video data signals may be passed to tee filter 522. The tee filter splits the video data signals into two substantially similar data streams. One of the data streams may be forwarded to first color space converter filter 524, and the other data stream may be forwarded to second color space converter 526. The first color space converter converts the first data stream such that the color space of the video data signals is similar to the system display color space. In one embodiment, the pixel format of the video data signals must match the video card pixel format (e.g., 16 bit RGB color or 24 bit RGB color, for example). Converted data signals from the first color space converter filter may be forwarded to the video renderer with transparency filter 528. The video renderer with transparency filter 528 renders the first data stream on a display in a transparent manner as described above with respect to FIGS. 4 through 9. Video data signals may also be converted or "flipped" about a vertical center line of each frame to make objects on one side of the scene appear on the same side of the display (in effect, the scene appears like a mirror on the display).

In this embodiment, the second color space converter filter 526 converts the second data stream into a red, green, blue, alpha (RGBA) color format, for example, for each pixel of the second data stream, wherein the alpha values may be used to hold extra pixel information. Converted data signals from the second color space converter filter may be forwarded to the color analyzer filter 530. The color analyzer filter analyzes the pixels of the second data stream and tags color values of pixels within specified color ranges with specific alpha "A" values. The second data stream with added tag information may be forwarded to blob detector filter 532.

The blob detector filter analyzes the data stream and finds blocks of pixels with specific alpha values and posts event notifications (e.g., messages) to a control window of the application program 502. The application program forwards these event notifications to the handle input events function 508. In one embodiment, the blob detector filter may be set to look for substantially contiguous blocks of a predetermined color that have been tagged by the color analyzer filter. A block is also known as a blob of color. Herein, a blob may have predetermined physical attributes with a distinctive color and may be represented digitally as a group of pixels. The blob detector filter may be informed of a specified window handle to which detected blobs may be reported. In one embodiment, a blob of a predetermined pattern is determined to be an input event when the blob is detected in the video data stream by the blob detector filter and the handle input events function verifies that the blob meets a set of predetermined criteria. The location of the blobs in the video data stream (that is, in the current video frame) may also be communicated to handle input events 508.

In the embodiment shown in FIG. 11, the blob detector filter and the color analyzer filter are shown as separate filters, although in alternate embodiments the functions of these filters may be combined into a single filter, or may be combined with the video renderer filter. One skilled in the art will recognize that various combinations of such filters may be used, and the present invention is not limited in this respect.

Figure 12:
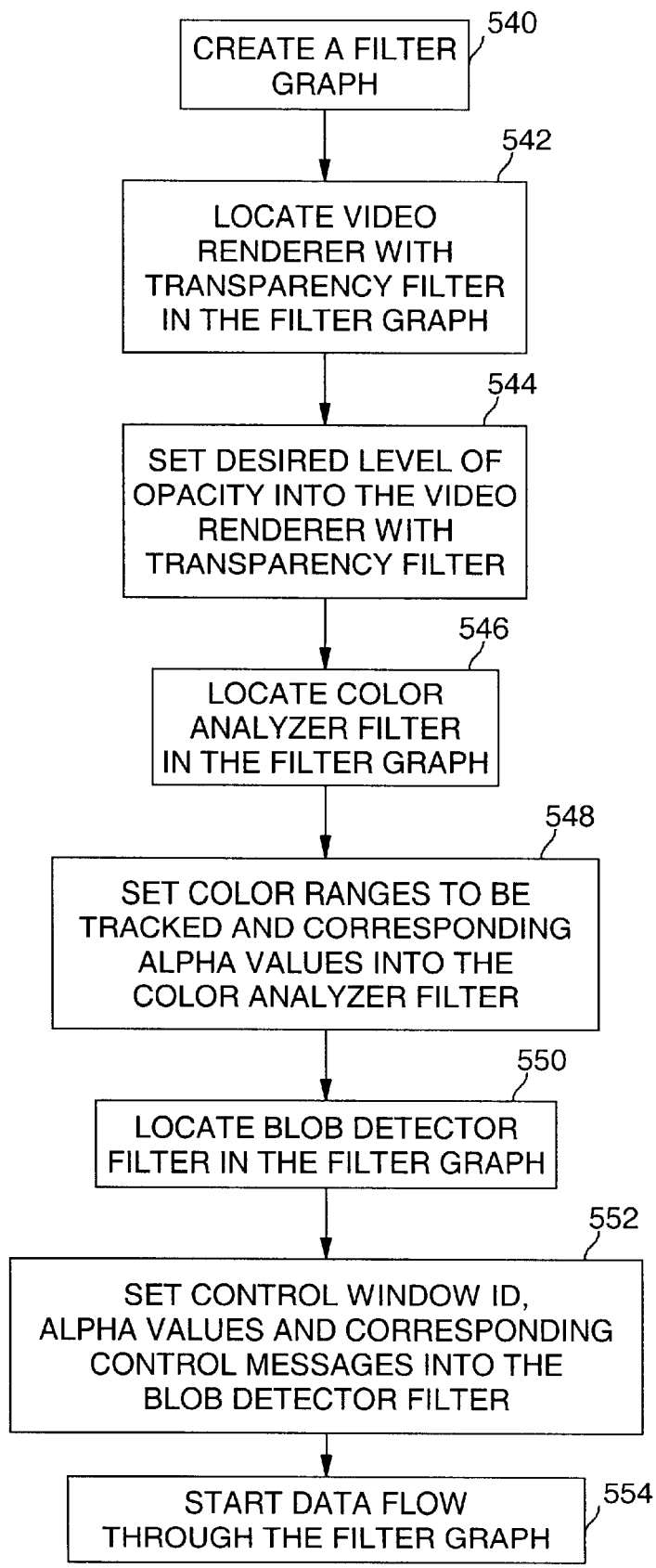
FIG. 12 is a flow diagram of filter initialization processing according to an embodiment of the present invention.

FIG. 12 is a flow diagram of filter initialization processing according to an embodiment of the present invention. Generally, filter initialization 506 instructs the filter graph manager 504 to create and initialize the filter graph 510 and begin the flow of video data signals into the filter graph. At block 540, filter initialization directs the filter graph manager to create a filter graph. At block 542, the video renderer with transparency filter may be located in the filter graph. Locating a filter means that an IFilter COM interface is retrieved based on the filter name and a configuration interface is then obtained through the filter. Next, at block 544, initialization parameters for the video renderer with transparency filter may be set. For example, the desired level of opacity may be set for future video data signal processing. Other initialization parameters include mirroring settings and interleaving patterns. At block 546, the color analyzer filter may be located in the filter graph. At block 548, the color ranges and corresponding alpha values of pixels in the video data stream to be tracked by the color analyzer filter may be set. For example, in an embodiment tracking the finger and thumb input events, the color ranges and alpha values of the finger and thumb may be set so that the color analyzer tags pixels in the video data stream having color values in the specified ranges. At block 550, the blob detector filter may be located in the filter graph. At block 552, a control window identifier, alpha values, and corresponding control messages may be set in the blob detector filter. At block 554, video data signal flow through the filter graph may be started.

Figure 13:
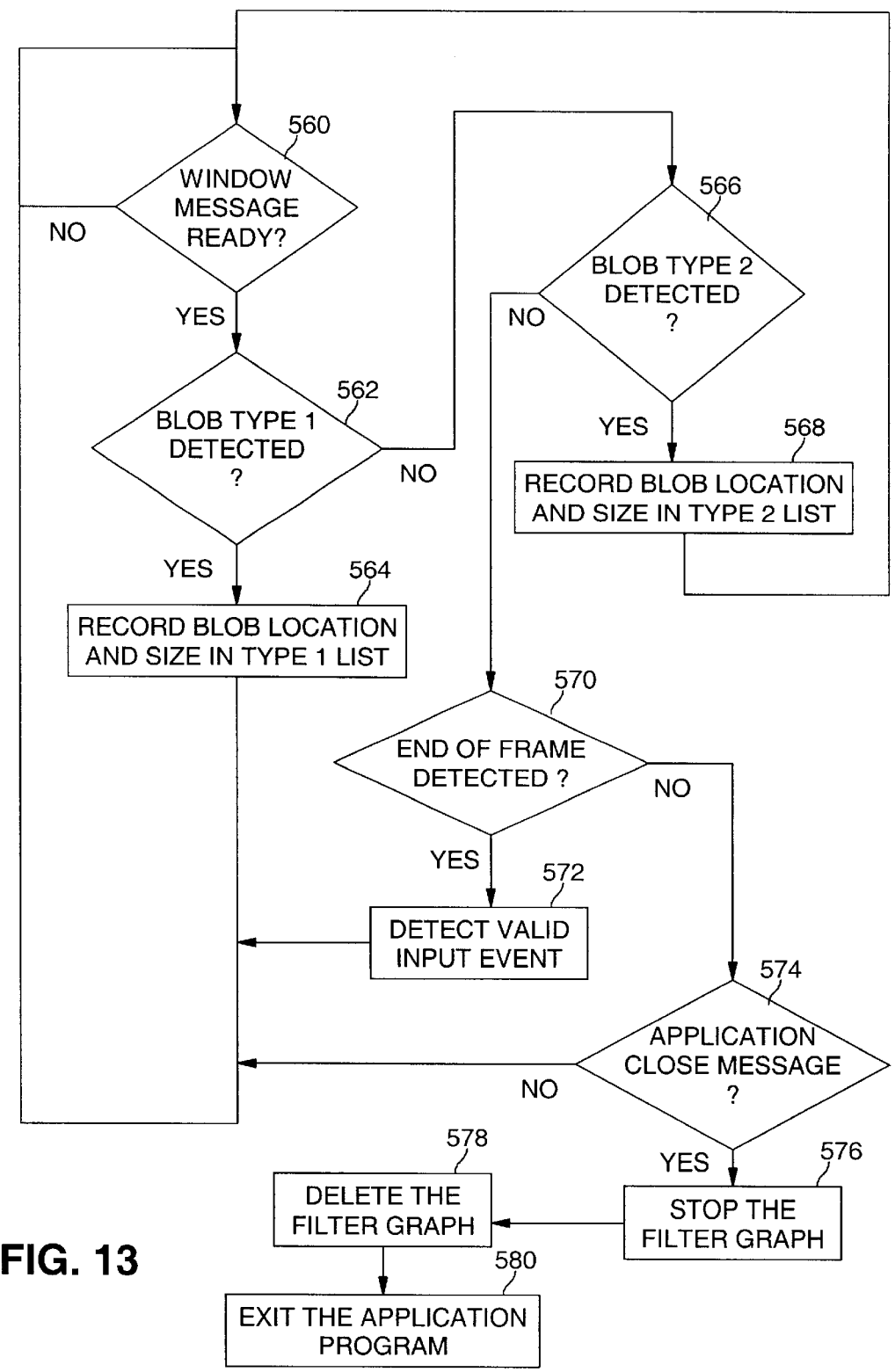
FIG. 13 is a flow diagram of handle input events processing according to an embodiment of the present invention.

Once the video data signals are flowing through the filter graph, an event notification called a window message may be received by handle input events 508 from the blob detector filter 532. FIG. 13 is a flow diagram of handle input events processing according to an embodiment of the present invention. Processing begins by waiting for a window message or event indication at block 560. If no window message or event is received, then handle input events continues to wait until a potential input event is received.

When a window message or event is received, further processing may be performed to determine if it is a potential input event. At block 562, the window message may be examined to determine if a blob type 1 event has been detected by the blob detector filter. In one embodiment, a blob type 1 may be associated with a predetermined physical artifact occurring in a video frame such as an index finger, for example, and a blob type 2 may be associated with another physical artifact occurring in a video frame such as a thumb, for example, although one skilled in the art will recognize that various physical artifacts and objects and their accompanying colors may be used in various embodiments as input indicators. In this embodiment, two distinct colors may be used as indicators, however in other embodiments any number of colors may be employed. In this embodiment, if blob type 1 is detected, then the size and location of the blob type 1 in the current video frame of the video data stream may be recorded in a data structure denoted the type 1 list at block 564. Processing then continues by waiting for another potential input event.

If blob type 1 was not detected at block 562, then processing continues at block 566, wherein the window message may be examined to determine if a blob type 2 event has been detected by the blob detector filter 532. If blob type 2 was detected, then the size and location of the blob type 2 in the current video frame of the video data stream may be recorded in a data structure denoted the type 2 list at block 568. Processing then continues by waiting for another potential input event. If blob type 2 was not detected, processing continues at block 570, wherein the window message may be examined to determine if an end of frame indicator has been detected by the blob detector filter. If an end of frame indicator was detected, then block 572 is processed to determine if a valid input event was detected in the current video frame. After block 572, processing continues by waiting for another window message at block 560. When the end of frame indicator is detected, the blobs detected during processing of the frame are stored in the blob lists. In one embodiment, the type 1 and type 2 lists store possible occurrences of two different physical objects represented in the video data stream. In other embodiments, any number of lists may be used to track a corresponding number of physical objects represented in the video data stream.

If an end of frame indicator was not detected, the window message may be examined at block 574 to determine if an application close message was received. If an application close message was received, the filter graph may be stopped at block 576, the filter graph may be deleted at block 578, and the application program 502 may be exited at block 580. Otherwise, an application close message was not received and processing continues by waiting for a window message at block 560.

Figure 14:
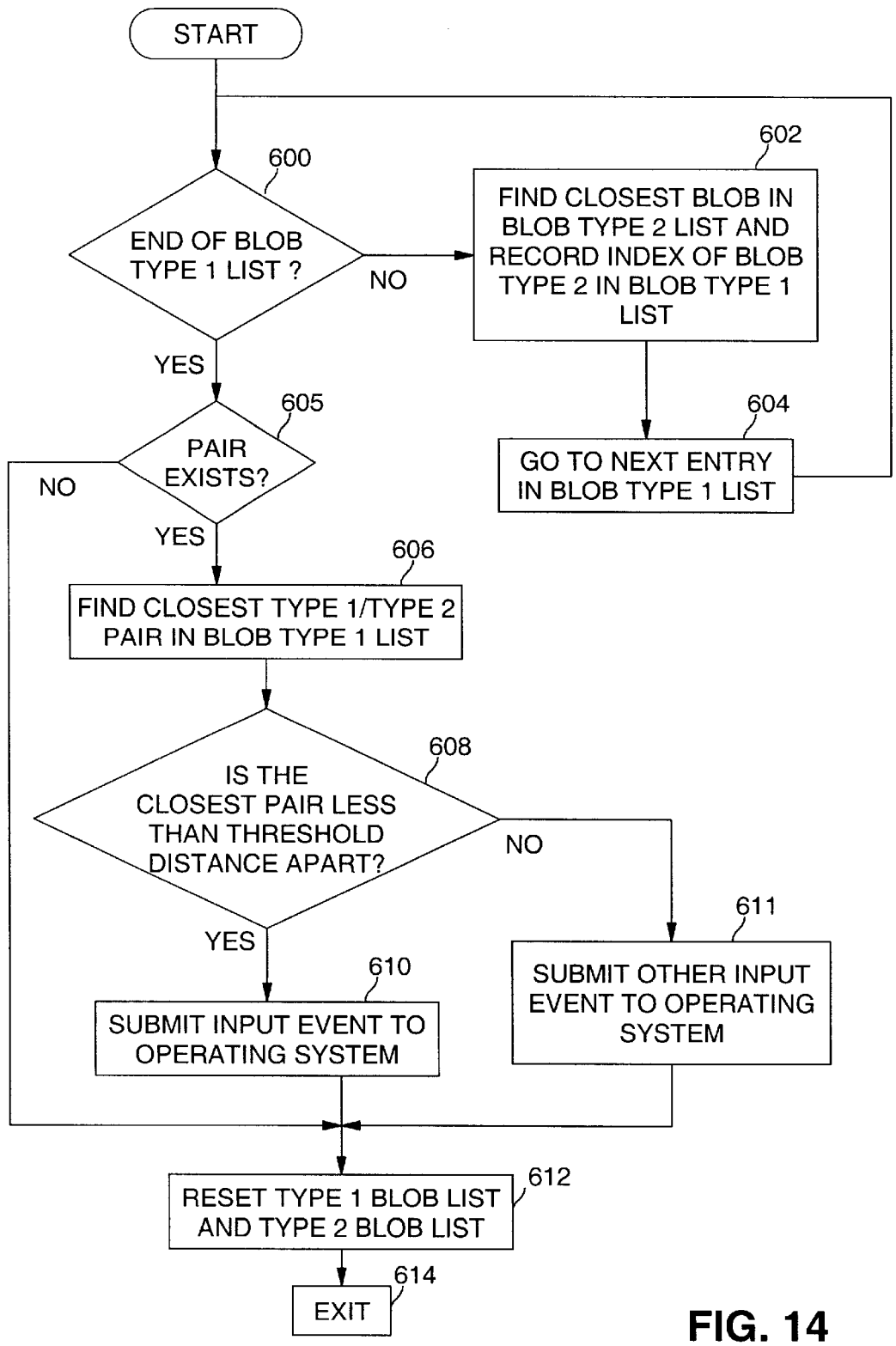
FIG. 14 is a flow diagram of processing for detecting valid input events according to an embodiment of the present invention.

FIG. 14 is a flow diagram of processing for detecting valid input events. At the beginning of detecting valid input events processing, a complete video frame may be processed by the filter graph and application program 502 may have at least two lists of blobs occurring in the video frame. In one embodiment, the two lists are the blob type 1 and blob type 2 lists, each list representing a blob color region space. Valid input event detection processing then comprises searching the blob lists to find the closest pair of blobs. Each pair is tested to determine if it is closer together than a selected threshold distance. If such a blob pair exists, then detection of this blob pair may be considered to be a valid input event. If more than one pair is detected, then the closest pair may be used for further processing. At block 600, detect valid input processing determines if the end of the blob type 1 list has been reached. If the end of the blob type 1 list has not been reached, then block 602 is performed to find a blob in the blob type 2 list that is closest in the video frame to the current blob type 1 and to record the index within the blob type 2 list of this closest blob type 2 into the current entry of the blob type 1 list. In this embodiment, closeness may be defined as the spatial distance between the centers of two blob locations in the two dimensional plane of the video frame. At block 604, the next entry in the blob type 1 list is selected for processing. Processing continues with this next blob type 1 at block 600. If there is no pair available at 605, then an appropriate flag or other indicator is set in the current entry of the blob type 1 list.

When the end of the blob type 1 list is reached, block 606 may be performed to find the closest blob type 1/blob type 2 pair in the blob type 1 list. If the closest pair is less than a threshold distance apart at block 608, then block 610 may be performed to submit the detected input event to the operating system software of the computer system. The operating system software may then pass the input event to other application programs as needed. In one embodiment, the location of the blobs in the current video frame may be mapped or otherwise converted to screen coordinates (e.g., normalized mouse coordinates) prior to reporting the input event. At block 610, if the closest pair is not less than the threshold distance apart, then block 611 may be performed to submit a different input event to the operating system software. Next, at block 612 the type 1 blob list and the type 2 blob list may be reset. Detect valid input event processing ends at block 614.

While the example of handling input events by detecting the movement of a user's finger and thumb has been described, one skilled in the art will recognize that the capture and analysis of a video data stream including a number of different physical objects of different colors and movements may be used to signify an input event, and that the invention is not limited in scope by way of the specific example shown herein. Additionally, in this embodiment, lists are used to store the blob information. In other embodiments, other data structures may be used and other techniques for searching the data structures to determine blob pairs may be also be used.

Figure 15:
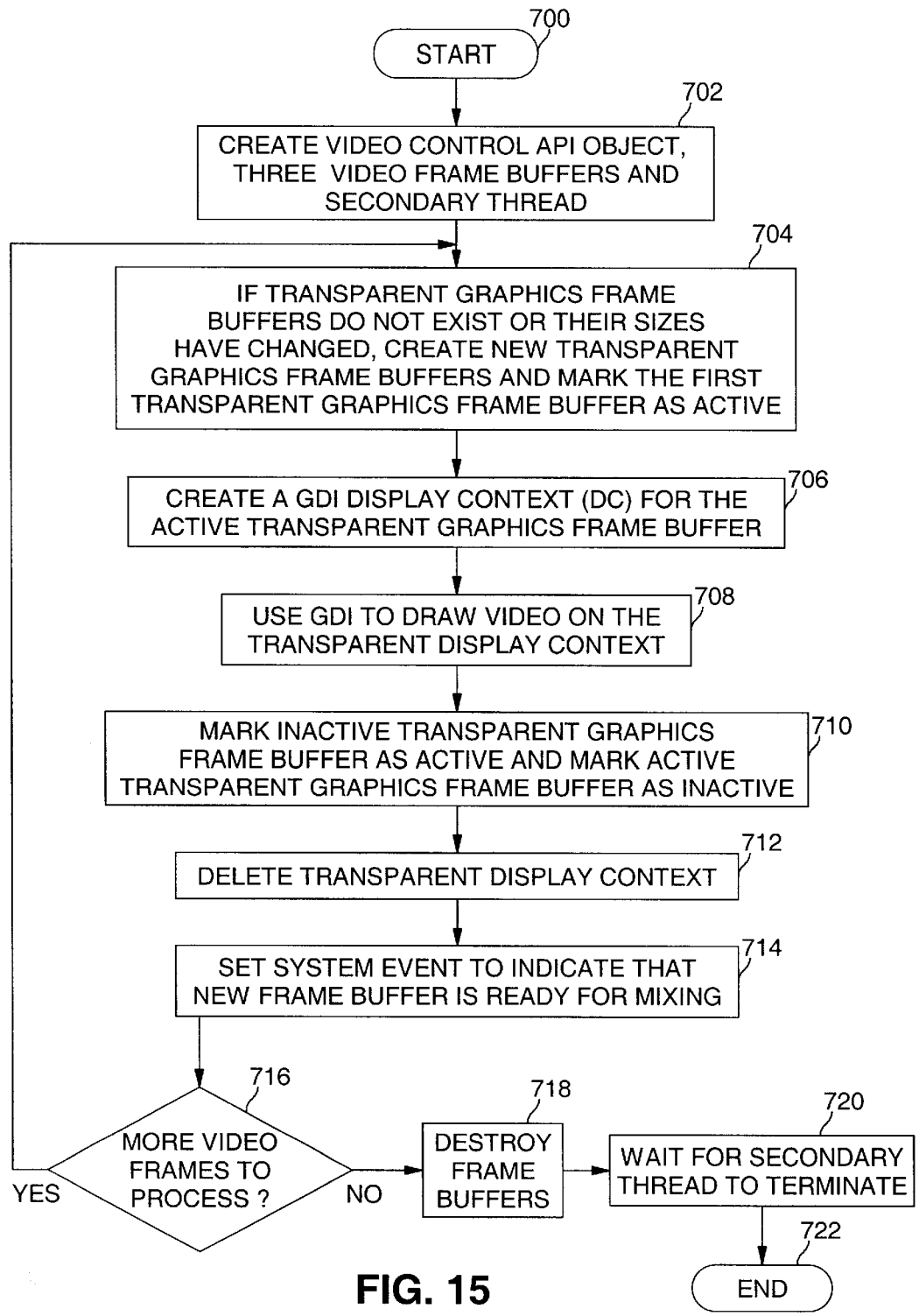
FIG. 15 is a flow diagram describing a processing thread of a video renderer with transparency according to an embodiment of the present invention.

FIG. 15 is a flow diagram describing a processing thread of a video renderer with transparency according to an embodiment of the present invention. Video renderer with transparency processing begins at block 700. At block 702, a video control API object (such as a DirectDraw™ object, for example), three video frame buffers and a secondary thread may be created. At block 704, if the transparent graphics frame buffers do not exist or one or more of their sizes have changed, then new transparent graphics frame buffers may be created and a first one of the transparent graphics frame buffers may be marked as the currently active frame buffer. At block 706, a graphics display interface (GDI) display context (DC) for the currently active transparent graphics frame buffer may be created. At block 708, the GDI may be used by the video renderer to draw video data signals on the transparent DC created in block 706. Next, at block 710 the currently inactive transparent graphics frame buffer may be marked as active and the active transparent graphics frame buffer may be marked as inactive. At block 712, the transparent DC is deleted. At block 714, a system event may be set to indicate that the newly inactive transparent graphics frame buffer is ready for color mixing and interleaving operations. At block 716, the video renderer determines if there are more video frames in the video data stream to process. If there are more video frames, then frame processing continues with block 704. If there are no more video frames to process, then the frame buffers may be destroyed at block 718. At block 720, the video renderer waits for the secondary thread (created above at block 702) to terminate. Video renderer processing then ends at block 722.

Figure 16:
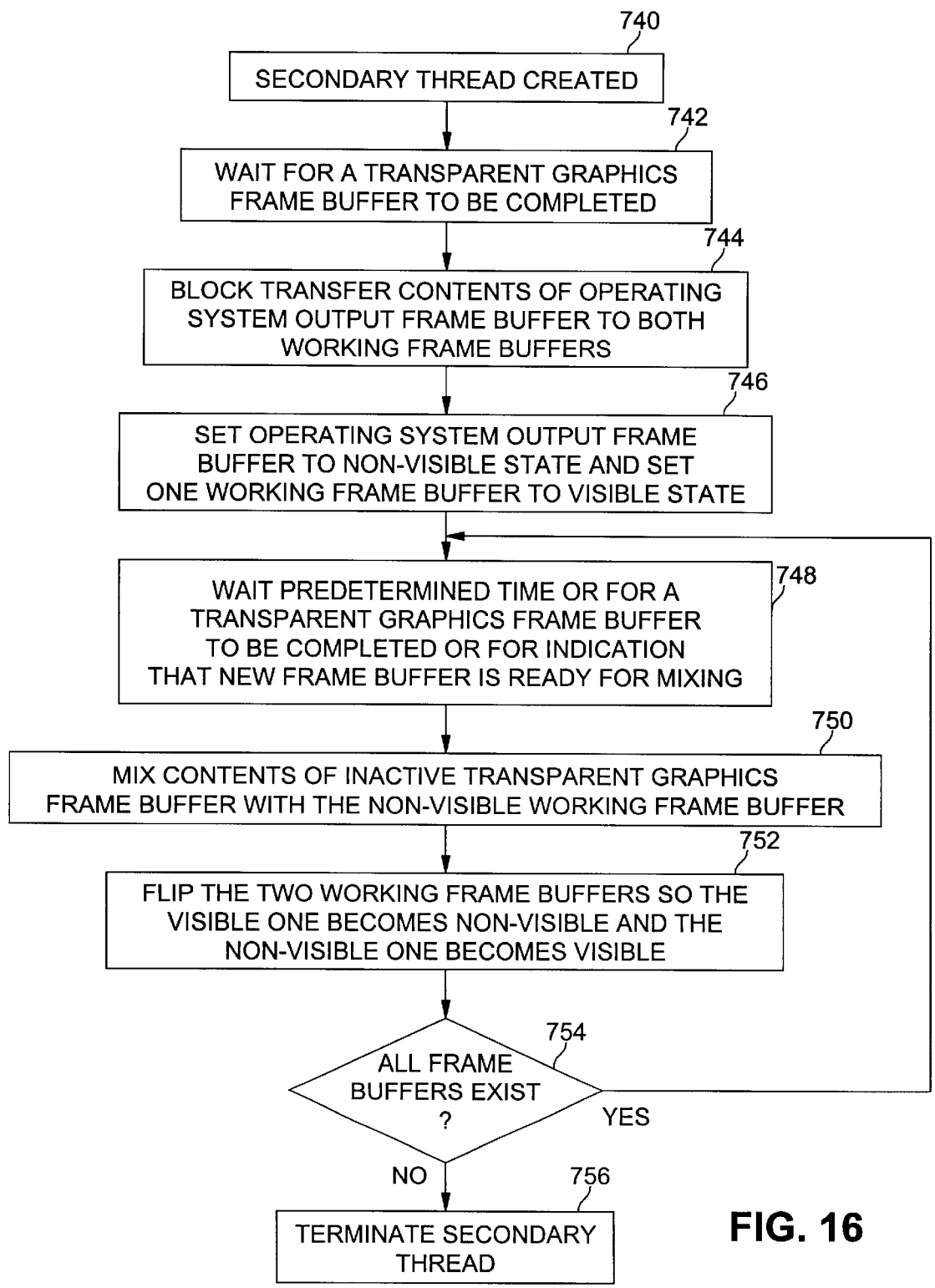
FIG. 16 is a flow diagram describing a processing thread of a transparency mixer core according to an embodiment of the present invention.

FIG. 16 is a flow diagram describing a processing thread of a transparency mixer core according to an embodiment of the present invention. This thread is the secondary thread created in block 702 of FIG. 15. The secondary thread may be a process or task independent of the main video renderer process. After the secondary thread is created (block 740), the transparency DC waits for a transparent graphics frame buffer to be completed. In one embodiment, a transparent graphics frame buffer is completed when it is ready to be color mixed and interleaved with other data signals. The event being waited for by the secondary thread may be the system event of block 714 of FIG. 15. At block 744, the contents of the operating system output frame buffer are block transferred to both of the working frame buffers. At block 746, the operating system output frame buffer may be set to a non-visible or inactive state and one of the working frame buffers may be set to a visible state. These two operations effectively "flip" the frame buffer used for displaying data signals on the display. At this point, the operating system output frame buffer is not directly visible on the display. At block 748, the secondary thread waits a predetermined period of time (such as 75 milliseconds, for example) or for a transparent graphics frame buffer to be completed.

When the secondary thread has waited the predetermined period of time or the transparent graphics frame buffer has been completed (that is, loaded with video data signals), the secondary thread mixes the contents of the inactive transparent graphics frame buffer with the non-visible working frame buffer at block 750. This mixing may be accomplished according to the method describing above in FIG. 8, for example, although the mixing operation may also be accomplished by dedicated mixing hardware. At block 752, the secondary thread flips the two working frame buffers so that the visible working frame buffer becomes the non-visible working frame buffer and the non-visible working frame buffer becomes the visible working frame buffer. If all frame buffers still exist at block 754, then further color mixing and interleaving processing may still be performed on the transparent graphics frame buffers, and processing continues with block 748. Otherwise, if any of the frame buffers do not exist, block 756 may be performed to terminate the transparent display context thread.

Figure 17:
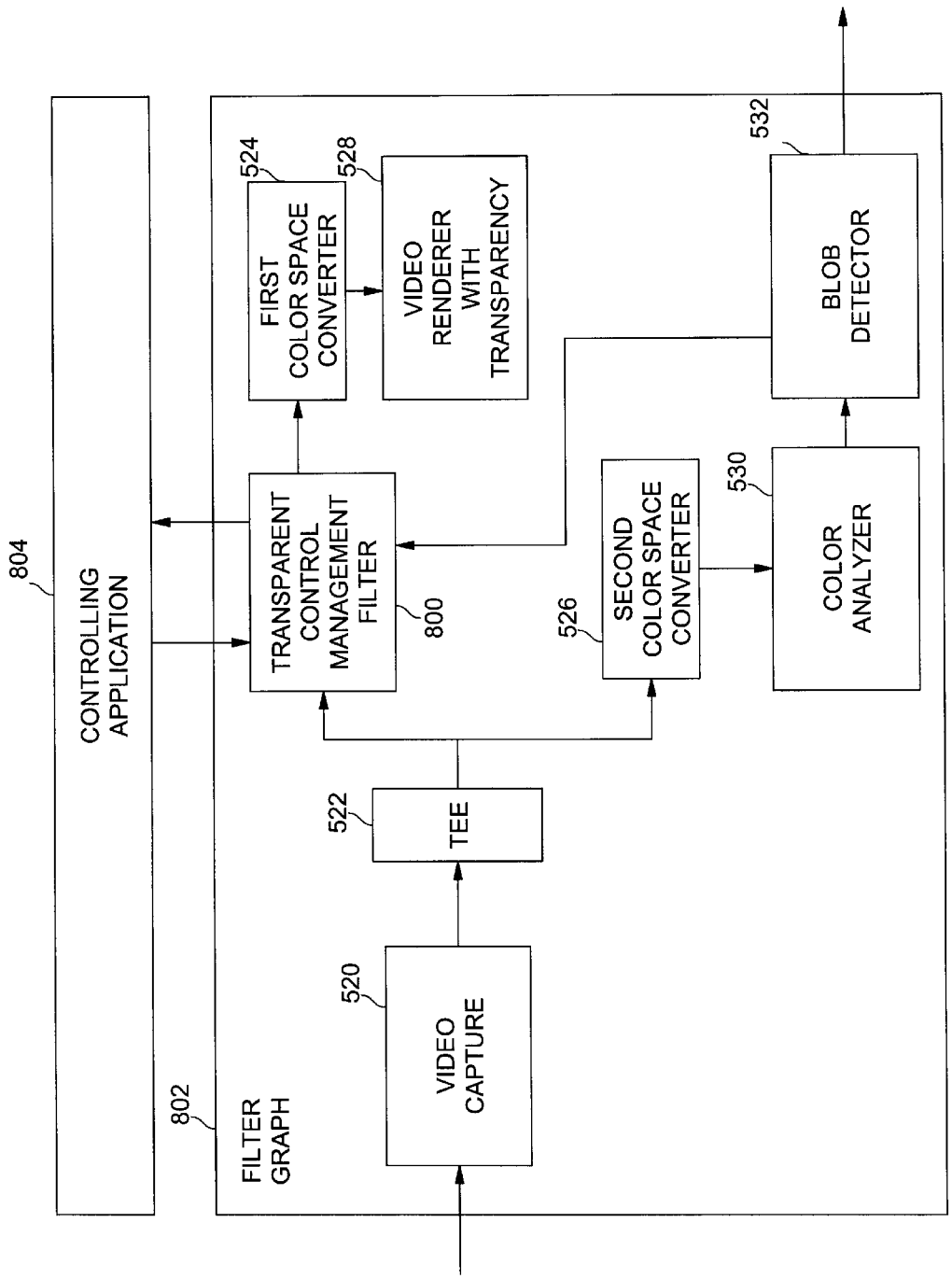
FIG. 17 is a diagram illustrating components of an application program providing a video reflection input technique using transparent user interface elements according to another embodiment of the present invention.

FIG. 17 is a diagram illustrating components of an application program providing a video reflection input technique using transparent user interface elements according to another embodiment of the present invention. This embodiment provides the capability for a user to interact with transparent user interface elements on the display. An additional filter called a transparent control management filter (TCMF) 800 may be inserted into a filter graph 802. This filter may be initialized, controlled, and communicated with in a substantially similar manner as the filters shown in FIG. 11. The TCMF accepts commands from a controlling application 804 to insert, or modify existing, transparent user interface elements such as controls, for example, into the video stream. This may be accomplished by drawing one or more controls, in a transparent manner, onto each video frame at a selected location as it passes through the filter using alpha blending techniques known in the art. In one embodiment, the controls may be slider bars, check boxes, radio buttons, menu, hyperlinks, and/or buttons, however, other controls may also be employed and the invention is not limited in scope in this respect. The transparent controls may be accessed only via live actions by the user which may be represented in the live video stream. The other filters and filter graph components perform substantially the same processing as described above with reference to FIG. 11. Additionally, blob detector 532 may communicate blob position information to TCMF 800.

In one embodiment, transparent control management filter (TCMF) 800 uses the blob position information to monitor the video frames being received by video capture 520 for blocks of pixels having flesh tones of a user's hand, for example, although the blob detector may also search for other colors in the video frames in other embodiments. If a sufficiently large block of contiguous pixels having one or more flesh-like tones, for example, appears in a video frame over or on top of, or at least partially coinciding with a transparent control (or within a predetermined distance from the center location of a control, for example), or on a specific part of a control (e.g., an arrow on a scroll bar), then that control is interpreted as being selected, activated or depressed. When a transparent control is considered to be selected, activated or depressed, the appearance of the transparent control may be modified to indicate to the user that the control has been selected, activated or depressed. For example, the level of transparency or the color of the control may be modified. As a result of activation, a control message may be passed to controlling application 804 according to the procedure discussed with reference to FIG. 10. Since the controlling application requested the insertion of the transparent control into the live video stream, the controlling application may be prepared to handle the control message and interpret the effect of the activation according to predetermined criteria.

Figure 18:
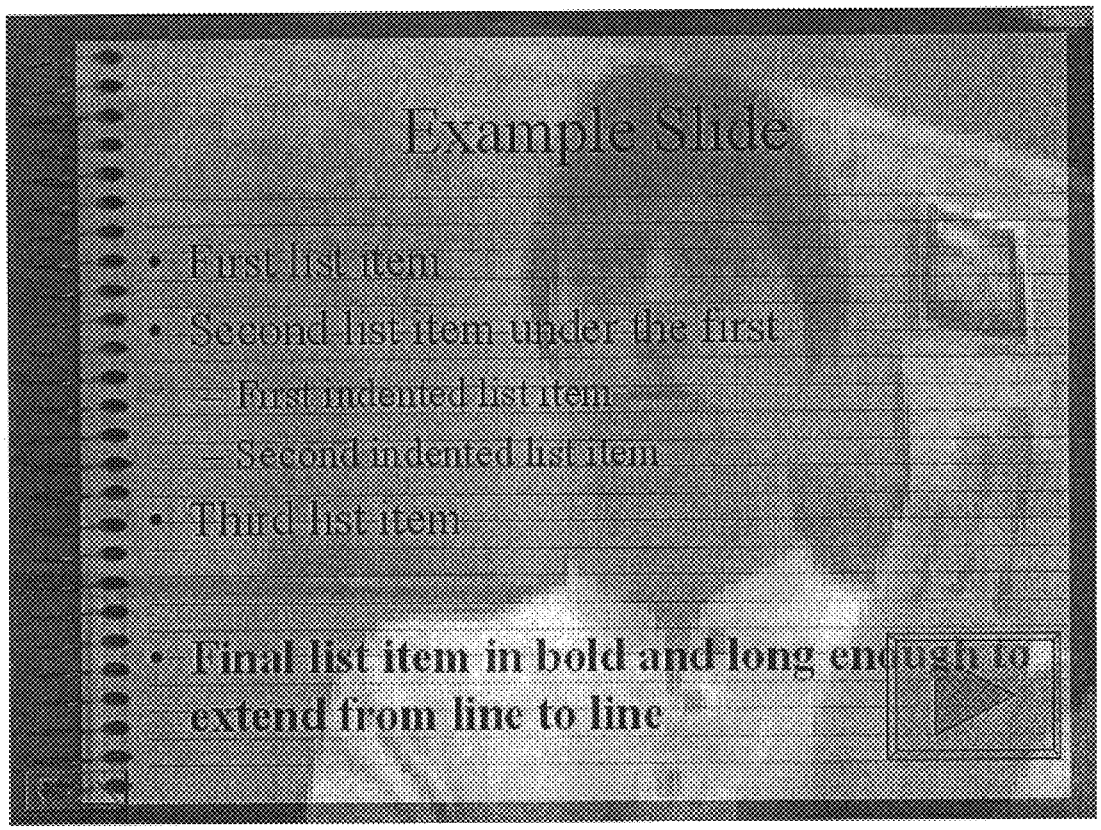
FIG. 18 is a diagram of a sample display portion illustrating a transparent user interface element according to an embodiment of the present invention.

For example, an embodiment of the present invention may be used in conjunction with the presentation of a multimedia slide show. FIG. 18 is a diagram of a sample display portion illustrating a transparent user interface element according to an embodiment of the present invention. The live video stream of the user or presenter as captured by a video camera may be overlaid in a transparent manner on top of non-transparent slides. The controlling application requests the insertion of a transparent control such as a button with the text "next slide" or an arrow, for example, into the live video stream by using TCMF 800. In one embodiment, the controlling application may be slide show presentation software such as the Power Point® application program commercially available from Microsoft Corporation, although other applications and other programs may also function as the controlling application. The presenter may then physically move his or her hand so that the reflected hand image captured by the video camera and represented on the display is over or at least partially coincides with the transparent control on the display. Upon detecting that the presenter's hand is over or at least partially coincides with the transparent control in one or more video frames of the live video stream, transparent control management filter 800 issues a notification or control message to controlling application 804 that the transparent control was activated. In response, the controlling application may send a "space key" event, for example, to the operating system, resulting in the slide presentation being advanced by the slide show presentation software to the next slide.

In this way, an embodiment of the present invention uses transparent controls designed to be manipulated by a user via a live video stream as an input mechanism. The transparent controls do not have to be a part of the application program that the controls are being used to control. Therefore, the transparent controls may be designed specifically for a "video as input" environment. Since the transparent controls are not part of the operating system's input scheme, the use of transparent controls may not interfere with ordinary controls, such as menus and icons and the like, even if the transparent controls appear on top of the ordinary controls.

Figure 19:
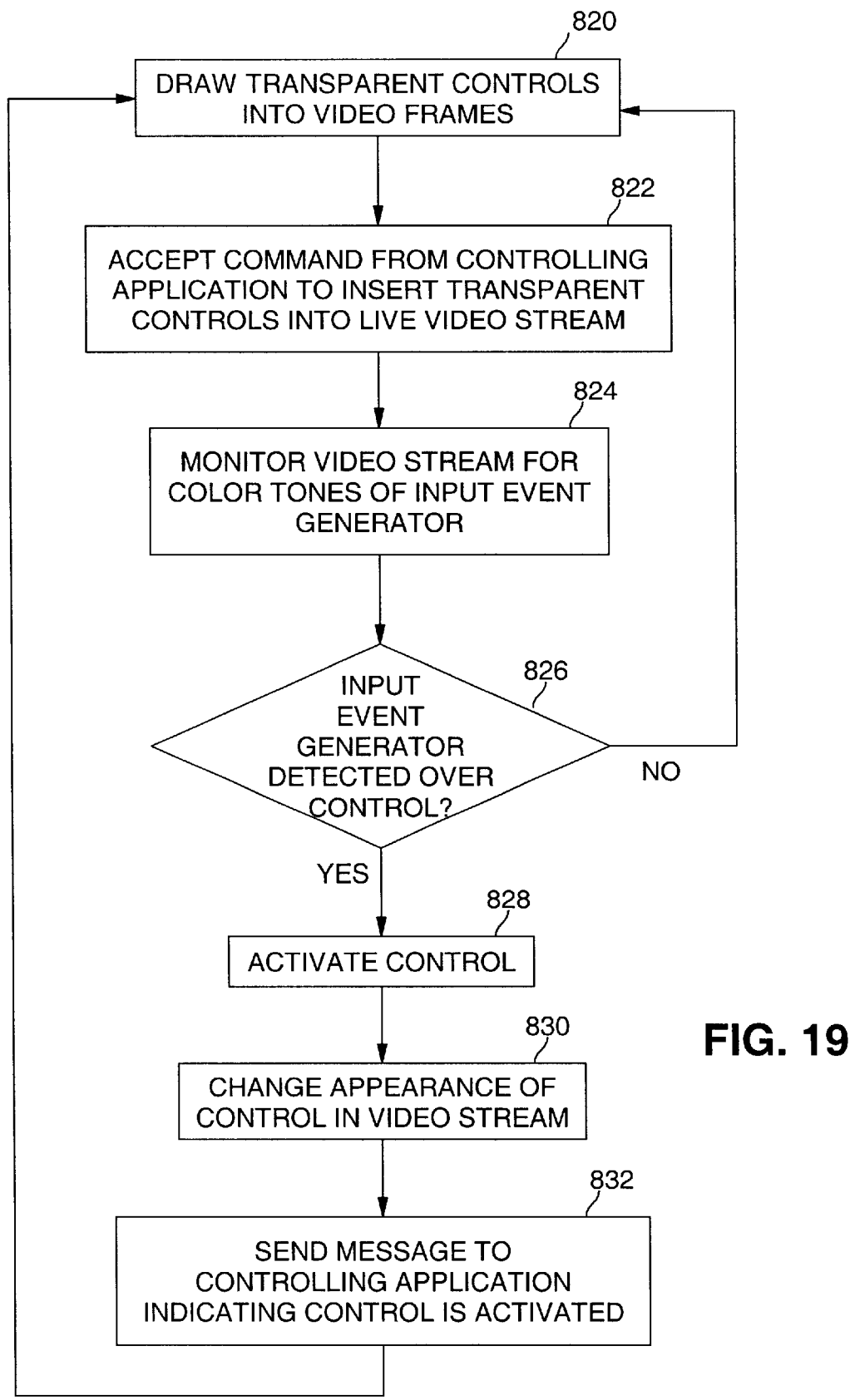
FIG. 19 is a flow diagram of processing for using transparent controls as user interface elements according to the embodiment of the present invention as shown in FIG. 17.

FIG. 19 is a flow diagram of processing for using transparent controls as user interface elements according to the embodiment of the present invention shown in FIG. 17. At block 820, the transparent controls may be drawn into the video frames as they are successively received from video capture 806. At block 822, transparent control management filter 800 accepts a command, if one is available, from controlling application 804 to insert, or modify, one or more transparent controls into the live video stream at a predetermined location. At block 824, the transparent control management filter monitors pixels of video frames of the video stream to detect blocks of color tones of a particular input event generator, such as the flesh tones of a human hand, for example, although the invention is not limited in scope in this respect. Other input event generators, such as props of a predetermined color, may also be employed. If the input event generator is detected as covering, at least in part, or being over the top of the transparent control at block 826, then the transparent control may be activated at block 828. The appearance of the transparent control on the display may then be changed to indicate acceptance of the input event to the user at block 830. At block 832, a control message may be sent to the controlling application indicating that the transparent control has been activated by the user. The controlling application may then perform processing appropriate to the activated control. Further drawing and monitoring of the transparent control may be effected again at block 820.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of providing input signals to an application program executing on a system having a display comprising:
    capturing live video data signals in real-time by a video camera, the video data signals representing a scene in the physical world;
    inserting at least one transparent user interface element into the video data signals;
    rendering the video data signals such that the scene and the at least one transparent user interface element are transparently visible on the display along with non-transparent output data of the application program;
    analyzing the video data signals to detect an object in the scene as rendered on the display as appearing over or at least partially coinciding with a location of the at least one transparent user interface element as rendered on the display;
    generating an input signal for the application program in response to detecting the object of the scene as rendered on the display as appearing over or at least partially coinciding with the at least one transparent user interface element as rendered on the display.

2. The method of claim 1, further comprising changing the appearance of the at least one transparent user interface element on the display when the input signal is generated.

3. The method of claim 1, wherein the at least one transparent user interface element comprises at least one transparent control.

4. The method of claim 3, wherein the input signal indicates activation of the at least one transparent control.

5. The method of claim 3, wherein the at least one transparent control comprises at least one of a button, check box, radio button, menu, hyperlink, and a slider bar.

6. The method of claim 1, wherein the scene includes a user of the system and the rendered scene comprises a reflected image of the user.

7. The method of claim 1, wherein the detected object comprises at least one body part of a user of the system.

8. The method of claim 1, wherein the detected object comprises at least one prop.

9. In a system having a source of live video data and a display, an apparatus comprising:
    means for capturing live video data signals in real-time by the video source, the video data signals representing a scene in the physical world;
    means for inserting at least one transparent user interface element into the video data signals;
    means for rendering the video data signals such that the scene and the at least one transparent user interface element are transparently visible on the display along with non-transparent output data of the application program;
    means for analyzing the video data signals to detect an object in the scene as rendered on the display as appearing over or at least partially coinciding with a location of the at least one transparent user interface element as rendered on the display; and
    means for generating an input signal for the application program in response to detecting the object of the scene as rendered on the display as appearing over or at least partially coinciding with the at least one transparent user interface element as rendered on the display.

10. The apparatus of claim 9, further comprising means for changing the appearance of the at least one transparent user interface element on the display when the input signal is generated.

11. In a system having a source of live video data signals and a display, the live video data signals representing a scene in the physical world captured in real-time, an apparatus comprising:
    a filter to insert at least one transparent user interface element into the video data signals, to render the video data signals such that the scene and the at least one transparent user interface element are transparently visible on the display along with non-transparent output data of the application program, to analyze the video data signals to detect an object in the scene as rendered on the display as appearing over or at least partially coinciding with a location of the at least one transparent user interface element as rendered on the display, and to generate an input signal for the application program in response to detecting the object of the scene as rendered on the display as appearing over or at least partially coinciding with the at least one transparent user interface element as rendered on the display.

12. The apparatus of claim 11, further comprising video capture circuitry to capture live video data signals generated by the live video data source.

13. The apparatus of claim 11, further comprising video render circuitry to render the scene and the at least one transparent user interface element on the display such that the scene and the at least one transparent user interface element are transparently visible on the display.

14. The apparatus of claim 11, further comprising a controlling application to send commands to the filter to insert the at least one transparent user interface element and to receive the generated input signal.

15. The apparatus of claim 11, wherein the at least one transparent user interface element comprises at least one transparent control.

16. The apparatus of claim 15, wherein the input signal indicates activation of the at least one transparent control.

17. The apparatus of claim 15, wherein the at least one transparent control comprises at least one of a button, check box, radio button, menu, hyperlink, and a slider bar.

18. An article comprising a machine readable medium having a plurality of machine readable instructions, wherein when the instructions are executed by a processor, the instructions cause a system to capture in real-time live video data signals generated by a video source, the video data signals representing a scene, insert at least one transparent user interface element into the video data signals, to render the video data signals such that the scene and the at least one transparent user interface element are transparently visible on the display along with non-transparent output data of the application program, to analyze the video data signals to detect an object in the scene as rendered on the display as appearing over or at least partially coinciding with a location of the at least one transparent user interface element as rendered on the display, and to generate an input signal for the application program in response to detecting the object of the scene as rendered on the display as appearing over or at least partially coinciding with the at least one transparent user interface element as rendered on the display.

19. The article of claim 18, wherein the machine readable medium further comprises instructions to change the appearance of the at least one transparent user interface element on the display when the input signal is generated.

* * * * *